US012164414B2

(12) United States Patent
Mola

(10) Patent No.: US 12,164,414 B2
(45) Date of Patent: *Dec. 10, 2024

(54) CROSS-THREAD MEMORY INDEXING IN TIME-TRAVEL DEBUGGING TRACES

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 79 days.

This patent is subject to a terminal disclaimer.

(21) Appl. No.: 18/069,071

(22) Filed: Dec. 20, 2022

(65) Prior Publication Data

US 2023/0124327 A1 Apr. 20, 2023

Related U.S. Application Data

(63) Continuation of application No. 17/715,597, filed on Apr. 7, 2022, now Pat. No. 11,567,854, which is a
(Continued)

(51) Int. Cl.
*G06F 11/00* (2006.01)
*G06F 11/32* (2006.01)
(Continued)

(52) U.S. Cl.
CPC ........ *G06F 11/3636* (2013.01); *G06F 11/323* (2013.01); *G06F 11/3495* (2013.01)

(58) Field of Classification Search
CPC ............... G06F 11/3636; G06F 11/323; G06F 11/3495; G06F 11/362; G06F 11/3466
See application file for complete search history.

(56) References Cited

U.S. PATENT DOCUMENTS 9,898,385 B1 * 2/2018 O'Dowd ............. G06F 11/3664
9,959,194 B1 5/2018 Mola
(Continued)

FOREIGN PATENT DOCUMENTS

CN 1959653 A 7/2010
CN 107025167 A 8/2017
(Continued)

OTHER PUBLICATIONS

"Office Action Issued in Indian Patent Application No. 202147040059", Mailed Date: Aug. 2, 2023, 8 Pages. (Ms#406217-IN-PCT).
(Continued)

*Primary Examiner* — Katherine Lin
(74) *Attorney, Agent, or Firm* — Workman Nydegger

(57) ABSTRACT

Exposing a memory cell value during trace replay prior to an execution time at which the memory cell value was recorded into a trace. A computer system identifies a first and a second trace fragment within a trace, each recording an uninterrupted consecutive execution of a plurality of executable instructions. The computer system determines that the first trace fragment is orderable prior to the second trace fragment and, based on an inter-fragment analysis, that a value of a memory cell recorded into the second trace fragment is compatible with the first trace fragment. The computer system generates output data indicating that the value of the memory cell can be exposed, during a replay of the trace, at a first execution time that is prior to a second execution time of an event that caused the value of the memory cell to be recorded into the second trace fragment.

20 Claims, 26 Drawing Sheets

Related U.S. Application Data continuation of application No. 17/216,101, filed on Mar. 29, 2021, now Pat. No. 11,321,220, which is a continuation of application No. 16/387,175, filed on Apr. 17, 2019, now Pat. No. 10,990,506, which is a continuation-in-part of application No. 16/381,350, filed on Apr. 11, 2019, now Pat. No. 11,068,378.

(51) Int. Cl.
*G06F 11/34* (2006.01)
*G06F 11/36* (2006.01)

(56) References Cited

U.S. PATENT DOCUMENTS

| | | |
|---|---|---|
| 2015/0378870 A1 | 12/2015 | Marron |
| 2018/0060213 A1 | 3/2018 | Mola |
| 2018/0217768 A1 | 8/2018 | Mola |

FOREIGN PATENT DOCUMENTS

| | | |
|---|---|---|
| CN | 104216764 A | 9/2017 |
| CN | 108694112 A | 10/2018 |

OTHER PUBLICATIONS

"Office Action Issued in Indian Patent Application No. 202147040625", Mailed Date: Aug. 3, 2023, 7 Pages. (Ms#406217A-IN-PCT).
Communication pursuant to Article 94(3) EPC Received for European Application No. 20722803.2, (MS# 406217-EP01-PCT) mailed on Mar. 21, 2024, 07 pages.
First Office Action Received for Chinese Application No. 202080027930, (MS# 406217-CN01-PCT) mailed on Feb. 28, 2024, 12 pages (English Translation Provided).
Office Action Received for Chinese Application No. 202080027948.X, (MS#406217A-CN01-PCT) mailed on Feb. 27, 2024, 10 pages (English Translation Provided).
U.S. Appl. No. 17/216,101, filed Mar. 29, 2021.
U.S. Appl. No. 17/715,597, filed Apr. 7, 2022.
U.S. Appl. No. 16/381,350, filed Apr. 11, 2019.
U.S. Appl. No. 16/387,175, filed Apr. 17, 2019.
Communication pursuant to Article 94(3) received in European Application No. 20721882.7, (MS# 406217A-EP01-PCT) mailed on Nov. 6, 2023, 6 pages.

\* cited by examiner

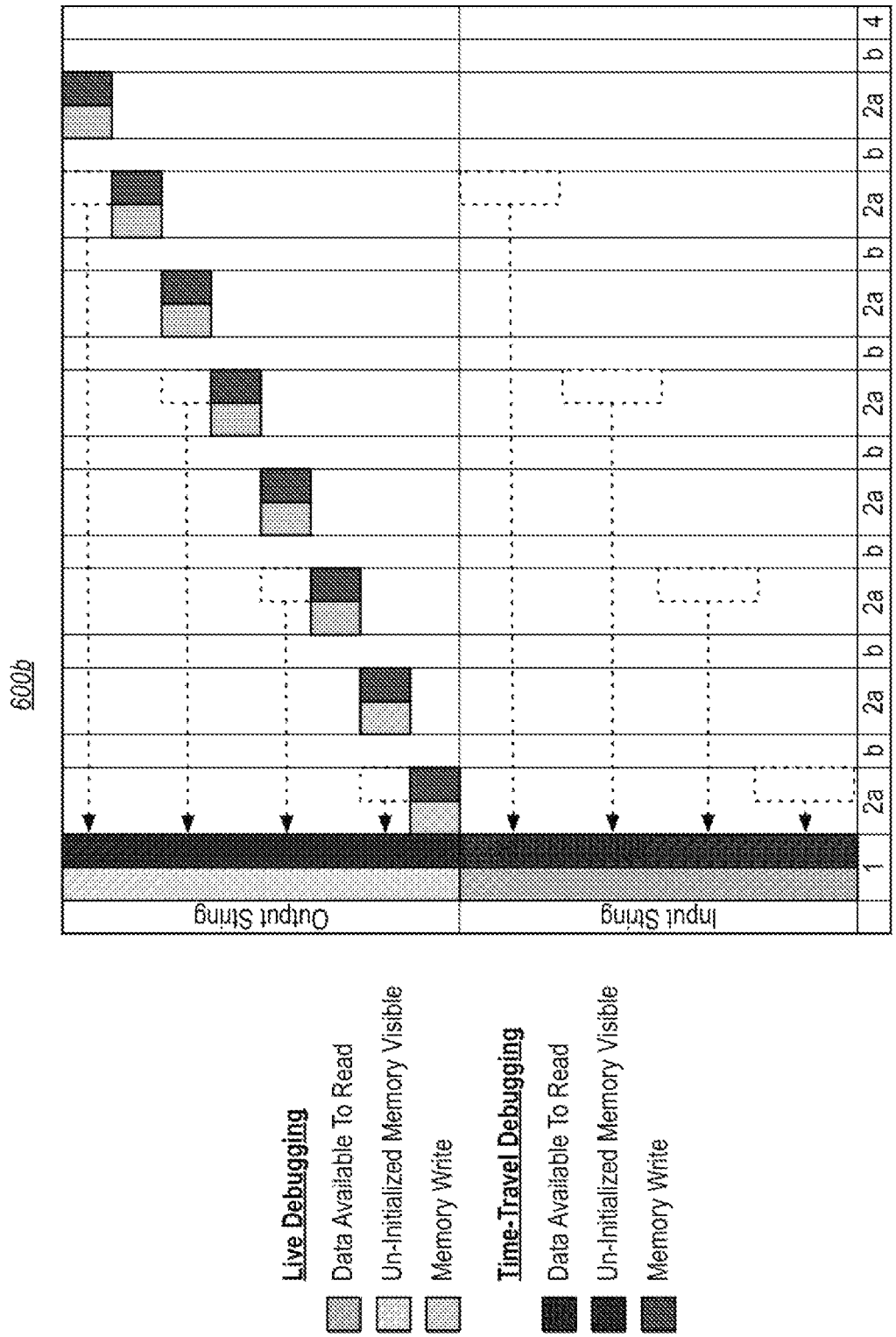

*FIG. 7B*

CROSS-THREAD MEMORY INDEXING IN TIME-TRAVEL DEBUGGING TRACES

CROSS-REFERENCE TO RELATED APPLICATIONS

This application is a continuation of U.S. patent application Ser. No. 17/715,597, filed Apr. 7, 2022, entitled "CROSS-THREAD MEMORY INDEXING IN TIME-TRAVEL DEBUGGING TRACES" and which issued as U.S. Pat. No. 11,312,220 on May 3, 2022; which is a continuation of U.S. patent application Ser. No. 17/216,101, filed Mar. 29, 2021, entitled "CROSS-THREAD MEMORY INDEXING IN TIME-TRAVEL DEBUGGING TRACES" and which issued as U.S. Pat. No. 11,321,220 on May 3, 2022; which is a continuation of U.S. patent application Ser. No. 16/387,175, filed Apr. 17, 2019, entitled "CROSS-THREAD MEMORY INDEXING IN TIME-TRAVEL DEBUGGING TRACES" and which issued as U.S. Pat. No. 10,990,506 on Apr. 27, 2021; and which is a continuation-in-part of U.S. patent application Ser. No. 16/381,350, filed Apr. 11, 2019, entitled "MEMORY VALUE EXPOSURE IN TIME-TRAVEL DEBUGGING TRACES" and which issued as U.S. Pat. No. 11,068,378 on Jul. 20, 2021. The entire contents of each of these applications are incorporated by reference herein in their entireties.

BACKGROUND

Tracking down and correcting undesired software behaviors in software code, often referred to as "debugging" code, is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming and difficult for a developer to identify a given undesired software behavior. Once an undesired software behavior has been identified, it can again be time-consuming and difficult to determine its root cause(s).

One approach developers have used to debug code is to use "live" debuggers. In general, a live debugger attaches to a live process's execution and enables a developer to monitor and guide that process's forward execution. For example, a live debugger may enable a developer to set a breakpoint that pauses the program's execution when it reaches particular instruction, to set a watchpoint that pauses the program's execution when it accesses a particular memory address, to single-step through lines of code as it executes, etc.

An emerging form of diagnostic tools enable "historic" debugging (also referred to as "time travel" or "reverse" debugging), in which the execution of at least a portion of a program's thread(s) is recorded/traced into one or more trace files (i.e., a trace). Using some tracing techniques, a trace can contain very high-fidelity "bit-accurate" historic trace data, which enables the recorded portion(s) the traced thread(s) to be virtually "replayed" at great fidelity—even down to the granularity of individual instructions (e.g., machine code instructions, intermediate language code instructions, etc.). Thus, using bit-accurate trace data, a "time travel" debugger enables a developer to not only monitor and guide a forward emulation of traced code (e.g., via breakpoints, watchpoints, single-stepping, etc.), but to also monitor and guide a reverse emulation of traced code (e.g., via reverse breakpoints, reverse watchpoints, reverse single-stepping, etc.). Thus, a developer can monitor and guide execution of any part of a programs prior trace.

While providing immense benefits over traditional live debuggers, there remain some limitations to time travel debugging technologies. For example, with modern processors executing potentially billions of instructions per second, the amount of trace data gathered during a program's execution has the potential to be astronomical. Accordingly, many time-travel debugging technologies employ tracing mechanisms that emphasize producing a minimal amount of trace data for each instruction executed. For instance, recognizing that most processor instructions are deterministic (i.e., they will always produce the same outputs when given the same inputs), some time-travel debugging technologies rely on representing the values of memory reads when they happen, as well as the side-effects (e.g., outputs) of any non-deterministic instructions. Notably, in order to reduce the overheads of a time travel tracer, the tracer may have a limited ability to keep record of which memory values it has logged prior. As such, the tracer might record multiple values for the same memory cell in connection with multiple reads from that memory cell, potentially adding redundant data to the time-travel trace.

Since a live debugger is attached to a live process, it has access to the process's entire memory space at all times, and thus can present any of the contents of any accessible memory cell at any moment in time. In contrast, when replaying time travel traces that represent memory reads as they happen, a time-travel debugger might only be able to determine the value at a given memory cell when there is a data packet in a trace representing a read from that cell. This means that, as compared to a live debugger, a time-travel debugger may be limited as to which memory contents it can produce at any given time. For instance, while a live debugger might be able to present the entire contents of a memory buffer upon that buffer's initialization (i.e., because the entire memory buffer is in the live process's memory space and available to the live debugger), a time-travel debugger might only be able to present the contents of the memory buffer progressively, as those contents are read by the traced code as it is being replayed by an emulator. Accordingly, while a time-travel debugger provides significant benefits over a live debugger, such as being able to analyze code both forwards and backwards, it may be limited as compared to a live debugger in its ability to present memory contents.

BRIEF SUMMARY

At least some embodiments described herein analyze a time-travel trace to identify memory cell values that can be presented, during trace replay, at an execution time that is earlier than an execution time corresponding to events (e.g., memory reads) that caused those memory cell values to be recorded in the trace. For example, embodiments may divide a trace into fragments—or sequences of consecutive instructions that executed on a single thread—and identify in at least one of these fragments a memory cell value corresponding to a read that occurred in this fragment that is compatible with other values of that memory cell in the fragment. This memory cell value can then be exposed earlier in the fragment, such as at the beginning of the fragment. Embodiments can also identify if this memory cell value is compatible with preceding fragments, and push this value across these fragments if it is compatible. Embodiments can also use heuristics to determine if this memory cell value is compatible with gaps in trace recording between fragments, and push this value across those gaps if it is compatible. Embodiments might generate indexing data to supplement an existing trace and to identify memory values in the trace that can be presented earlier than where they appear in the trace, might re-write/modify an existing trace to rearrange where memory values appear in the trace, or might generate entirely new traces that include rearranged memory values.

At least some embodiments described herein analyze a time-travel trace to identify and insert memory snapshot data that enables one or more threads to be replayed/queried independent of one or more other threads in a trace, while still being able to present a correct view of memory locations that were interacted with by those other threads. In particular, a trace might represent execution of multiple threads of execution. In such an embodiment, the trace data of the multiple threads is typically interleaved, and playback would normally need to process the data related to all threads. In embodiments, a trace might represent execution of each thread using a separate trace data stream, yet one thread's execution might modify memory that is visible to another thread. In some embodiments, one or more of the disclosed solutions may insert, into a data stream associated with the given thread, memory snapshot data that identifies memory that one or more other thread(s) interacted with while they executed (e.g., concurrent to the given thread, or during a suspension of the given thread). These memory snapshots enable the given thread to be replayed/queried independent of the other threads, while still being able to present a correct view of memory locations that were interacted with by those other threads. When inserting memory snapshots, these embodiments might treat threads individually (i.e., to enable an individual thread to be replayed/queried independent of other thread(s)) and/or as a group of threads (i.e., to enable a group of threads to be replayed/queried independent of other thread(s)).

Some embodiments include methods, systems, and computer program products for generating data for exposing memory cell values during trace replay at execution times that are prior to execution times corresponding to events that caused the memory cell values to be recorded into a trace. These embodiments include identifying a plurality of trace fragments within a trace that represents prior execution of one or more threads. Each trace fragment represents an uninterrupted consecutive execution of a plurality of executable instructions on a corresponding thread of the one or more threads. The plurality of trace fragments includes at least a first trace fragment and a second trace fragment. These embodiments determine at least a partial ordering among the plurality of trace fragments, including determining that the first trace fragment can be ordered prior to the second trace fragment. For at least the second trace fragment, these embodiments determine that a memory cell value can be exposed, during replay of the second trace fragment, at a first execution time that is prior to a second execution time corresponding to an event that caused the memory cell value to be recorded into the trace fragment during trace recording. These embodiments then generate output data indicating that the memory cell value can be exposed at the first execution time during replay of the second trace fragment.

Other embodiments include methods, systems, and computer program products for modifying a trace to expose memory cell values prior to execution times corresponding to events that caused the memory cell values to be recorded into the trace. These embodiments include accessing a trace that represents prior execution of one or more threads and identifying, within the trace, a plurality of data packets that each represents a corresponding memory cell value read from a particular memory cell. Each of the plurality of data packets corresponds to at least one execution event. These embodiments also include selecting a particular memory cell value represented in one of the plurality of data packets. These embodiments also include modifying the trace by performing at least one of (i) removing all but one of the plurality of data packets from at least one trace fragment, or (ii) inserting data into the trace that exposes the selected particular memory cell value at an execution time during trace replay that is prior to execution times of the execution events corresponding to the plurality of data packets and removing the plurality of data packets from the trace.

Yet other embodiments include methods, systems, and computer program products for creating memory snapshot data that reduces processing for thread-focused analysis. These embodiments include identifying a plurality of trace fragments within a trace that represents prior execution of a plurality of threads. Each trace fragment represents an uninterrupted consecutive execution of a plurality of executable instructions on a corresponding thread of the plurality of threads. The plurality of trace fragments includes a first and a second trace fragment corresponding to a first thread, and a third trace fragment corresponding to a second thread. These embodiments also include determining at least a partial ordering among the plurality of trace fragments, including determining that the first trace fragment is orderable prior to the second trace fragment on the first thread, and that the third trace fragment is orderable between the first and second trace fragments. These embodiments also include, based on the third trace fragment being orderable between the first and second trace fragments, identifying at least one memory cell that is interacted with by one or more executable instructions whose execution is represented by the third trace fragment and inserting memory snapshot data into trace data corresponding to the first thread, the memory snapshot data at least identifying the at least one memory cell.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6B illustrates an example timing diagram corresponding to execution of a single fragment that performs a string copy, including performing intra-fragment memory movement;

FIG. 7B illustrates an example timing diagram corresponding to execution of a single fragment that performs a string copy, including performing intra-fragment memory movement;

DETAILED DESCRIPTION

Figure 1A:
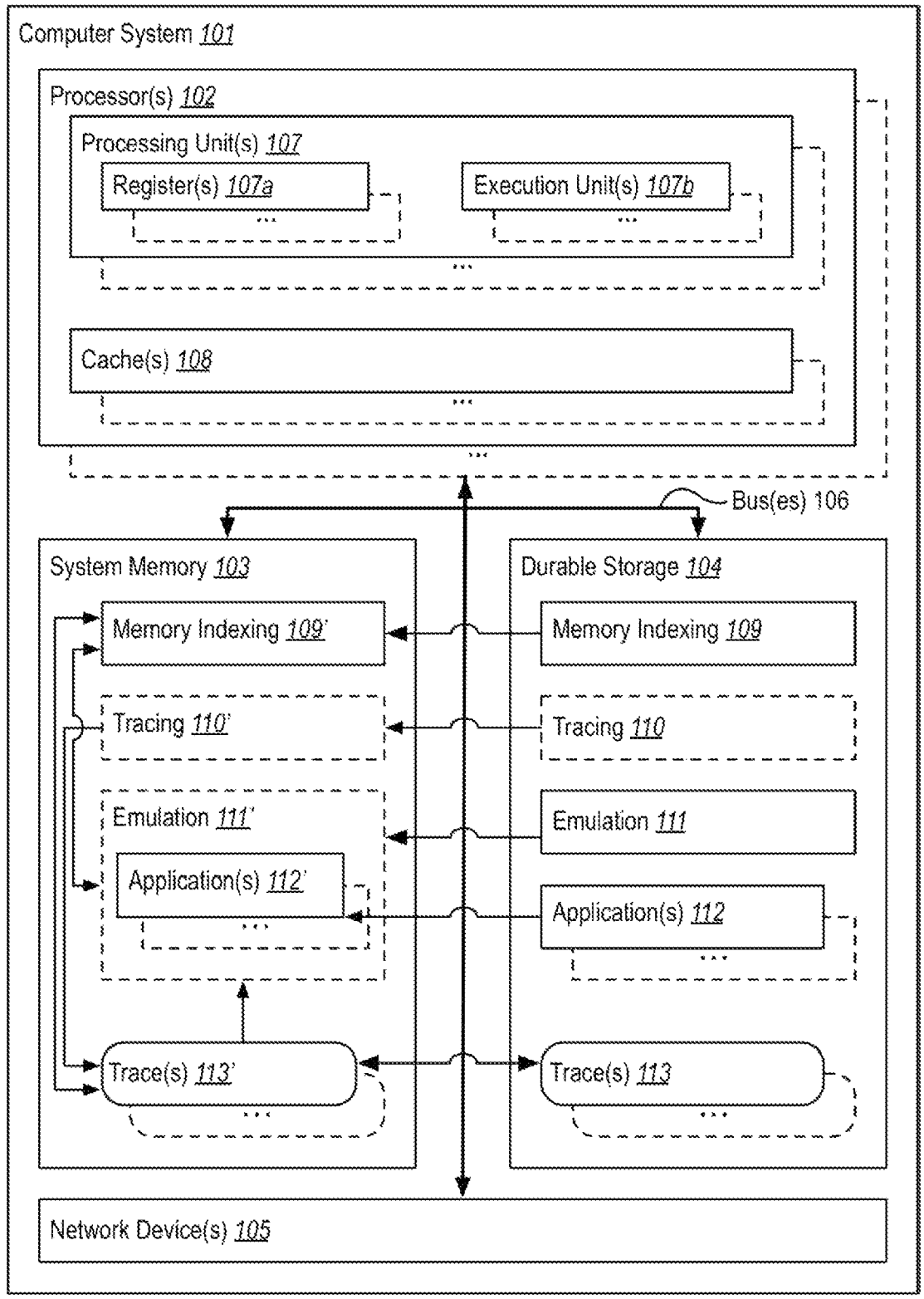
FIG. 1A illustrates an example computing environment that facilitates exposing memory cell values prior to execution times corresponding to events that caused the memory cell values to be recorded into a trace.

At least some embodiments described herein analyze a time-travel trace to identify memory cell values that can be presented, during trace replay, at an execution time that is earlier than an execution time corresponding to events (e.g., memory reads) that caused those memory cell values to be recorded in the trace. For example, embodiments may divide a trace into fragments—or sequences of consecutive instructions that executed on a single thread—and identify in at least one of these fragments a memory cell value corresponding to a read that occurred in this fragment that is compatible with other values of that memory cell in the fragment. This memory cell value can then be exposed earlier in the fragment, such as at the beginning of the fragment. Embodiments can also identify if this memory cell value is compatible with preceding fragments, and push this value across these fragments if it is compatible. Embodiments can also use heuristics to determine if this memory cell value is compatible with gaps in trace recording between fragments, and push this value across those gaps if it is compatible. Embodiments might generate indexing data to supplement an existing trace and to identify memory values in the trace that can be presented earlier than where they appear in the trace, might re-write/modify an existing trace to rearrange where memory values appear in the trace, or might generate entirely new traces that include rearranged memory values.

At least some embodiments described herein analyze a time-travel trace to identify and insert memory snapshot data that enables one or more threads to be replayed/queried independent of one or more other threads in a trace, while still being able to present a correct view of memory locations that were interacted with by those other thread. In particular, a trace might represent execution of multiple threads of execution. In such an embodiment, the trace data of the multiple threads is typically interleaved, and playback would normally need to process the data related to all threads. In embodiments, a trace might represent execution of each thread using a separate trace data stream, yet one thread's execution might modify memory that is visible to another thread. In some embodiments, one or more of the disclosed solutions may insert, into a data stream associated with the given thread, memory snapshot data that identifies memory that one or more other thread(s) interacted with while they executed (e.g., concurrent to the given thread, or during a suspension of the given thread). These memory snapshots enable the given thread to be replayed/queried independent of the other threads, while still being able to present a correct view of memory locations that were interacted with by those other threads. When inserting memory snapshots, these embodiments might treat threads individually (i.e., to enable an individual thread to be replayed/queried independent of other thread(s)) and/or as a group of threads (i.e., to enable a group of threads to be replayed/queried independent of other thread(s)).

FIG. 1A illustrates an example computing environment 100a that facilitates exposing memory cell values prior to execution times corresponding to events that caused the memory cell values to be recorded into a trace and creating memory snapshot data that reduces processing for thread-focused analysis (e.g., replay/querying). As depicted, computing environment 100a may comprise or utilize a special-purpose or general-purpose computer system 101, which includes computer hardware, such as, for example, one or more processors 102, system memory 103, durable storage 104, and/or network device(s) 105, which are communicatively coupled using one or more communications buses 106.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network device(s) 105), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, each processor 102 can include (among other things) one or more processing units 107 (e.g., processor cores) and one or more caches 108. Each processing unit 107 loads and executes machine code instructions via the caches 108. During execution of these machine code instructions at one more execution units 107b, the instructions can use internal processor registers 107a as temporary storage locations and can read and write to various locations in system memory 103 via the caches 108. In general, the caches 108 temporarily cache portions of system memory 103; for example, caches 108 might include a "code" portion that caches portions of system memory 103 storing application code, and a "data" portion that caches portions of system memory 103 storing application runtime data. If a processing unit 107 requires data (e.g., code or application runtime data) not already stored in the caches 108, then the processing unit 107 can initiate a "cache miss," causing the needed data to be fetched from system memory 103—while potentially "evicting" some other data from the caches 108 back to system memory 103.

As illustrated, the durable storage 104 can store computer-executable instructions and/or data structures representing executable software components; correspondingly, during execution of this software at the processor(s) 102, one or more portions of these computer-executable instructions and/or data structures can be loaded into system memory 103. For example, the durable storage 104 is shown as storing computer-executable instructions and/or data structures corresponding to a memory indexing component 109, a tracing component 110, an emulation component 111, and one or more application(s) 112. The durable storage 104 can also store data, such as one or more trace(s) 113 that represent one or more executions of one or more of the application(s) 112.

In general, the memory indexing component 109 takes one or more of the trace(s) 113 as input and, based on analysis of those trace(s) 113, the memory indexing component 109 identifies memory cell value(s) that can be exposed during replay of the trace(s) 113 at execution times that are prior to the execution time(s) corresponding to events that caused the memory cell values to be recorded into the trace(s) 113. The memory indexing component 109 can then generate indexing data to complement the trace(s) 113, to generate new trace(s) 113 incorporating changes consistent with the indexing data, and/or to modify or re-write existing trace(s) 113 consistent with the indexing data. Thus, FIG. 1A shows that the memory indexing component 109 and the trace(s) 113 are loaded into system memory (i.e., memory indexing component 109' and trace(s) 113'), and a double-ended arrow between the memory indexing component 109' and the trace(s) 113' indicates that the memory indexing component 109' can read from, and potentially write to, those trace(s) 113'; if data is written to trace(s) 113', this data might also be persisted to the trace(s) 113 in durable storage 104.

As mentioned, the memory indexing component 109 performs analysis on trace(s) 113. In embodiments this analysis may include one or both of a static analysis or a dynamic analysis. As used herein, a static analysis comprises the memory indexing component 109 performing the analysis based on data read from the trace(s) 113 only. A dynamic analysis, on the other hand, can use data that is generated/obtained from a replay/emulation of application(s) 112 based on those trace(s) 113. Thus, FIG. 1A shows that the emulation component 111 may also be loaded into system memory 103 (i.e., emulation component 111'), and that the application(s) 112 may be emulated by the emulation component 111' (i.e., application(s) 112'). A double-ended arrow between the memory indexing component 109' and emulation component 111' indicates that the memory indexing component 109' can request trace emulation by the emulation component 111', and that the emulation component 111' can provide results of that trace emulation to the memory indexing component 109'.

If present, the tracing component 110 can record or "trace" execution of one or more of application(s) 112 into the trace(s) 113. The tracing component 110 can record execution of application(s) 112 whether that execution be on the processor(s) 102 directly, whether that execution be on the processor(s) 102 via a managed runtime. Thus, FIG. 1A also shows that the tracing component 110 may be loaded into system memory 103 (i.e., tracing component 110'). An arrow between tracing component 110' and trace(s) 113' indicates that the tracing component 111' can record trace data into trace(s) 113' (which might then be persisted to the durable storage 104 as trace(s) 113).

Figure 2:
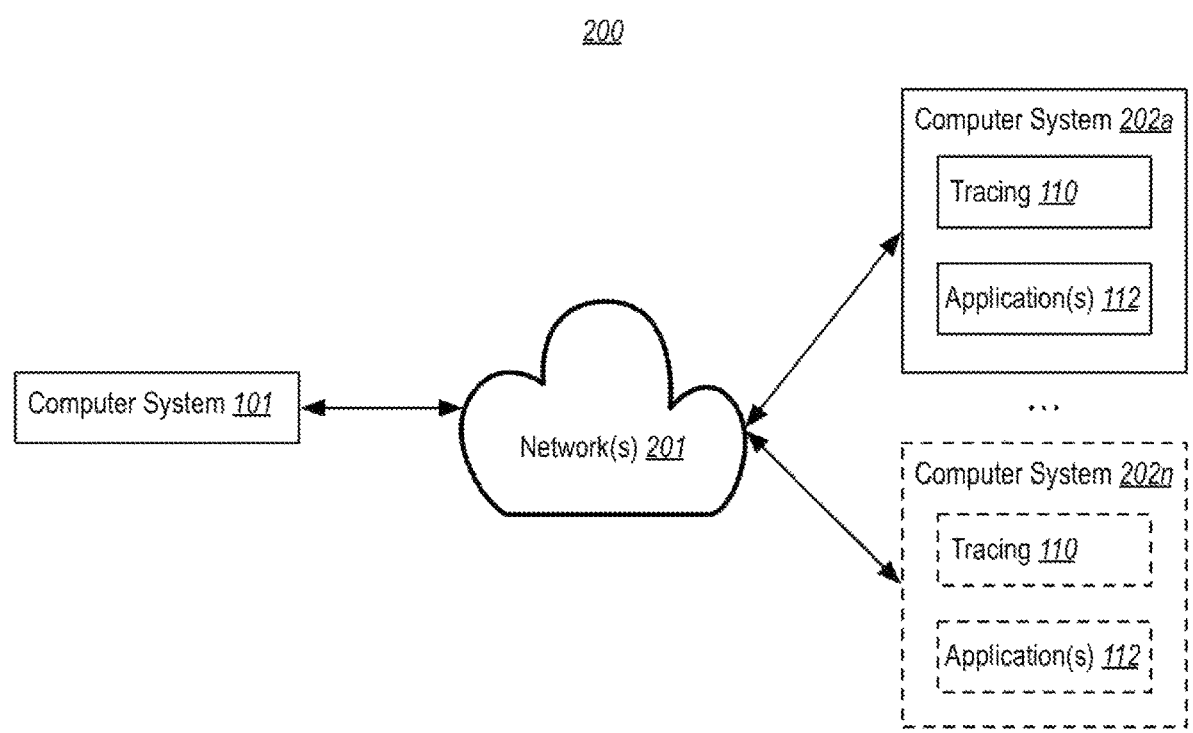
FIG. 2 illustrates an example in which the computing environment of FIG. 1A is networked with one or more other computer systems.

Computer system 101 might additionally, or alternatively, receive one or more of the trace(s) 113 from another computer system (e.g., using network device(s) 105). For example, FIG. 2 illustrates an example computing environment 200 in which computer system 101 of FIG. 1A is connected to one or more other computer systems 202 (i.e., computer systems 202a-202n) over one or more networks 201. As shown in computing environment 200, each computer system 202 includes a tracing component 110 and application(s) 112. As such, computer system 101 may receive, over the network(s) 201, one or more trace(s) 113 of prior execution(s) of one or more of application(s) 112 at these computer system(s) 202.

It is noted that, while the memory indexing component 109, the tracing component 110, and/or the emulation component 111 might each be independent components or applications, they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part.

In embodiments, the memory indexing component 109, the tracing component 110, and/or the emulation component 111 operate on trace(s) 113 that comprise high-fidelity "bit-accurate" trace data recording a prior execution of one or more threads of an application 112, and in which the trace data enables any traced portion(s) of those thread(s) to be emulated (i.e., "replayed") by the emulation component 111 down to the granularity of individual instructions (e.g., machine code instructions, intermediate language code instructions, etc.). As used herein, a "bit accurate" trace is a trace that includes sufficient data to enable code of an application 112 that was previously executed (e.g., at computer system 101 and/or at one or more of computer systems 202), to be replayed via emulation by the emulation component 111, such that the emulation component 111 simulates execution of this code in substantially the same manner as it executed prior. There are a variety of approaches that the tracing component 110 might use to record and store bit-accurate traces. Two different families of approaches that provide high levels of performance and reasonable trace size are now briefly summarized, though it will be appreciated that the embodiments herein create and operate on traces recorded using other approaches. Additionally, optimizations could be applied to either of these families of approaches that, for brevity, are not described herein.

A first family of approaches is built upon the recognition that processor instructions (including virtual machine "virtual processor" instructions) generally fall into one of three categories: (1) instructions identified as "non-deterministic" as not producing predictable outputs because their outputs are not fully determined by data in general registers (e.g., registers 107a) or a cache (e.g., cache(s) 108), (2) deterministic instructions whose inputs do not depend on memory values (e.g., they depend only on processor register values, or values defined in the code itself), and (3) deterministic instructions whose inputs depend on reading values from memory. Thus, in some embodiments, storing enough state data to reproduce the execution of instructions can be accomplished by addressing: (1) how to record non-deterministic instructions that produce output not fully determined by their inputs, (2) how to reproduce the values of input registers for instructions depending on registers, and (3) how to reproduce the values of input memory for instructions depending on memory reads.

In some embodiments, the first approach(es) record into the trace(s) 113 the execution of non-deterministic instructions that produce output not fully determined by their inputs by storing into the trace(s) 113 the side-effects of execution of such instructions. As used herein, "non-deterministic" instructions can include somewhat less common instructions that (i) produce non-deterministic output each time they are executed (e.g., RDTSC on INTEL processors, which writes the number of processor cycles since the last processor reset into a register), that (ii) may produce a deterministic output, but depend on inputs not tracked during trace recording (e.g. debug registers, timers, etc.), and/or that (iii) produce processor-specific information (e.g., CPUID on INTEL processors, which writes processor-specific data into registers). Storing the side-effects of execution of such instructions may include, for example, storing register values and/or memory values that were changed by execution of the instruction. In some architectures, such as from INTEL, processor features such as those found in Virtual Machine eXtensions (VMX) could be used to trap instructions for recording their side effects into the trace(s) 113.

Addressing how to reproduce the values of input registers for deterministic instructions (e.g., whose inputs depend only on processor register values) is straightforward, as they are the outputs of the execution of the prior instruction(s). Thus, the first approach(es) for recording traces can therefore reduce recording the execution of an entire series of processor instructions to storing data that can be used to reproduce the register values at the beginning of the series. In embodiments, the trace(s) 113 may not even need store a record of which particular instructions executed in the series, or the intermediary register values. This is because the actual instructions are available from the application code, itself. These instructions can therefore be supplied the recorded inputs (i.e., the recorded initial set of register values) during reply, to execute in the same manner as they did during the trace.

Finally, the first approach(es) for recording traces can address how to reproduce the values of input memory for deterministic instructions whose inputs depend on memory values by recording into the trace(s) 113 the memory values that these instructions consumed (i.e., the reads)—irrespective of how the values that the instructions read were written to memory. In other words, some trace(s) 113 might record the values of memory reads, but not memory writes. For example, although values may be written to memory by a current thread, by another thread (including the kernel, e.g., as part of processing an interrupt), or by a hardware device, it is just the values that the thread's instructions read that are needed for full replay of instructions of the thread that performed the reads. This is because it is those values that were read by the thread (and not necessarily all the values that were written to memory) that dictated how the thread executed.

A second family of approaches for recording bit-accurate traces is built on the recognition that a processor (e.g., processor 102) forms a semi- or quasi-closed system. For example, once portions of data for a process (i.e., code data and runtime application data) are loaded into cache(s) 108, processor 102 can run by itself—without any input—as a semi- or quasi-closed system for bursts of time. In particular, once the cache(s) 108 are loaded with data, one or more of processing units 107 execute instructions from a code portion of the cache(s) 108, using runtime data stored in a data portion of the cache(s) 108 and using the registers 107a.

When a processing unit 107 needs some influx of information (e.g., because an instruction it is executing, will execute, or may execute accesses code or runtime data not already in the cache(s) 108), a "cache miss" occurs and that information is brought into the cache(s) 108 from system memory 103. The processing unit 107 can then continue execution using the new information in the cache(s) 108 until new information is again brought into the cache(s) 108 (e.g., due to another cache miss or an un-cached read). Thus, in the second family of approaches, the tracing component 110 might record sufficient data to be able to reproduce the influx of information into the cache(s) 108 as a traced processing unit executes.

Figure 3:
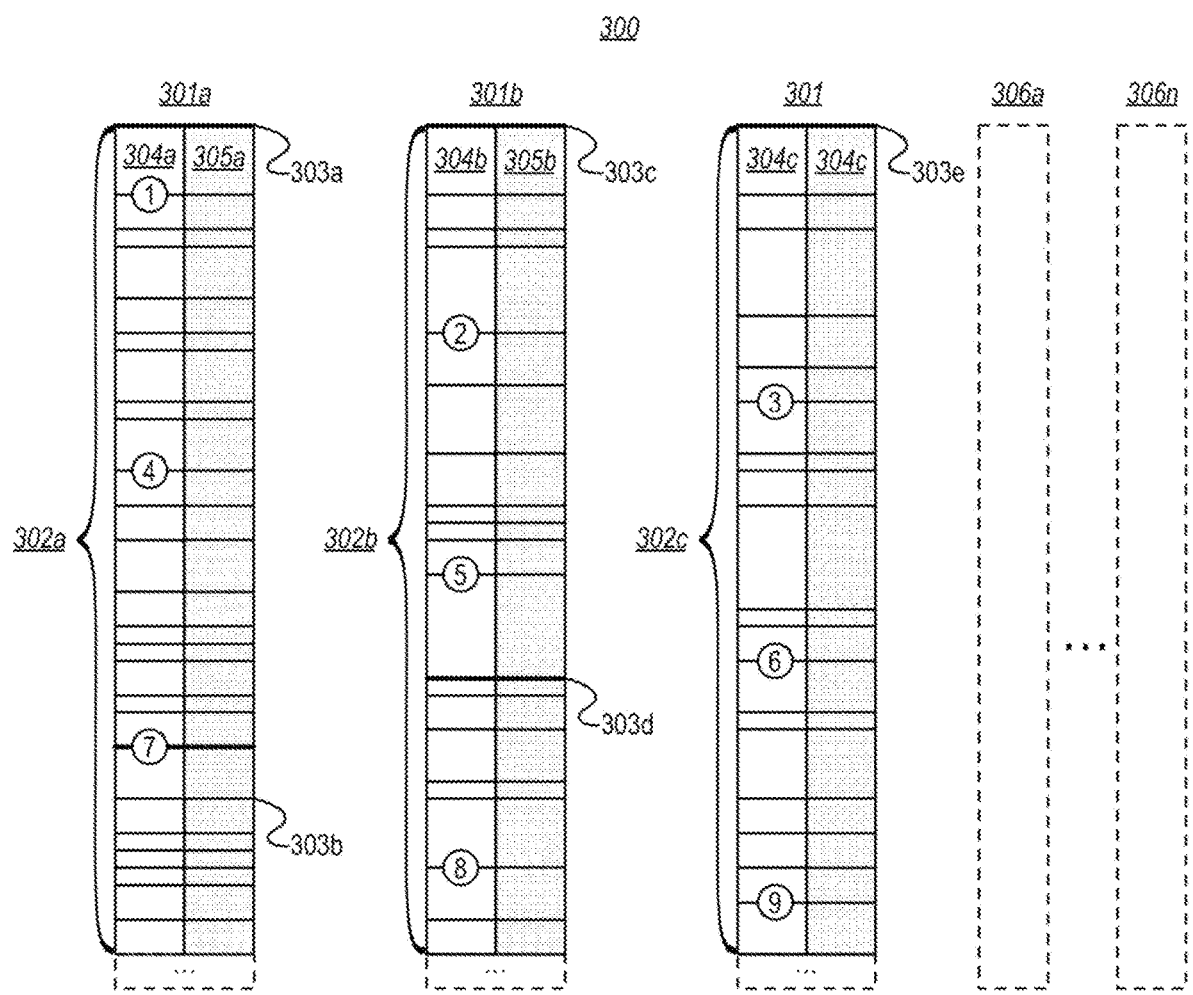
FIG. 3 illustrates one example of a time-travel debugging trace.

FIG. 3 illustrates one example of a trace 300, which might correspond to one or more of trace(s) 113 of FIG. 1A, and which could be created in accordance with one or more of the foregoing tracing techniques. In the example of FIG. 3, trace 300 includes one or more trace data streams 301. In FIG. 3, three trace data streams 301 are illustrated (i.e., trace data streams 301a-301c). In embodiments, each trace data stream 301 represents execution of a different thread that executed from the code of an application 112. For example, trace data stream 301a might represent execution of a first thread of an application 112, trace data stream 301b might represent execution of a second thread of an application 112, and trace data stream 301c might represent execution of a third thread of that application 112. As shown, each trace data stream 301 comprises a plurality of data packets 302 (i.e., data packet 302a for trace data stream 301a, data packets 302b for trace data stream 301b, and data packets 302c for trace data stream 301c). Since the particular data logged in each data packet 302 might vary, they are shown as having varying sizes. In general, when using time-travel debugging technologies, each data packet 302 represents at least the inputs (e.g., register values, memory values, cache line data, etc.) to one or more executable instructions that executed as part of this first thread of the application 112. As shown, the trace data streams 301 might also include one or more key frames 303 (e.g., key frames 303a-303e) that each represents sufficient information, such as a snapshot of register and/or memory values, that enables the prior execution of the thread containing the key frame to be replayed by the emulation component 111 starting at the point of the key frame 303 forwards. In addition, trace data stream 301 might include one or more sequencing events, shown in FIG. 3 as circles numbered 1-9. While each trace data stream 301 generally traces a given thread independently, sequencing events represent the occurrence of events that are orderable across the threads. These sequencing events may correspond, for example, to events in which threads interact, such as through shared memory, via function calls, etc. While, for simplicity, the order of events in trace data streams 301 rotate through the threads a round-robin manner, it will be appreciated that they would typically appear in a less predictable manner.

In embodiments, a trace 113 might also include the actual code that was executed. Thus, in FIG. 3, each data packet 302 is shown as including a non-shaded data inputs portion 304 (i.e., data inputs portion 304a for data packets 302a, data inputs portion 304b for data packets 302b, and data inputs portion 304c for data packets 302c) and a shaded code portion 305 (i.e., code portion 305a for data packets 302a, code portion 305b for data packets 302b, and code portion 305c for data packets 302c). In embodiments, the code portion 305 in the packets 302 might include the executable instructions that executed based on the corresponding data inputs. In other embodiments, however, a trace 113 might omit the actual code that was executed, instead relying on having separate access to the code of the application 112 (e.g., from durable storage 104). In these other embodiments, each data packet may, for example, specify an address or offset to the appropriate executable instruction(s). As shown, a trace 113 might include any number of additional data streams 306 (i.e., data streams 306a-306n), which can store any type of additional trace data. This additional trace data may include, for example, indexing data such as occasional memory snapshots, reverse-lookup data structures for quickly locating memory addresses/values in the trace data streams 301, etc.

The disclosure herein refers to inserting data into a trace that exposes a memory cell value at an execution time that is prior to an execution time corresponding to an event (e.g., a memory read) that caused the memory cell value to be recorded into the trace. Such data could be inserted anywhere in a trace file or trace data stream, regardless of where the original memory cell value was recorded in the trace file or trace data stream, so long as such data causes the memory cell value to be exposed, during trace replay, prior to an execution time at which the memory cell value would have otherwise been exposed. As such, when referring to inserting such data, it will be appreciated that the time/location at which this data is inserted is relative to execution time, rather than position of data packets in a trace file or trace data stream. Additionally, it will be appreciated by one of ordinary skill in that art that inserting data into a trace that exposes a memory cell value can encompass one or both of (i) inserting the memory cell value into the trace directly, or (ii) inserting into the trace a means to recover and/or calculate that memory cell value (e.g., by inserting a compressed version of the value; by inserting a reference to where the value can be found, such as in another trace data stream; by inserting a reference to how the value can be calculated, etc.).

Figure 1B:
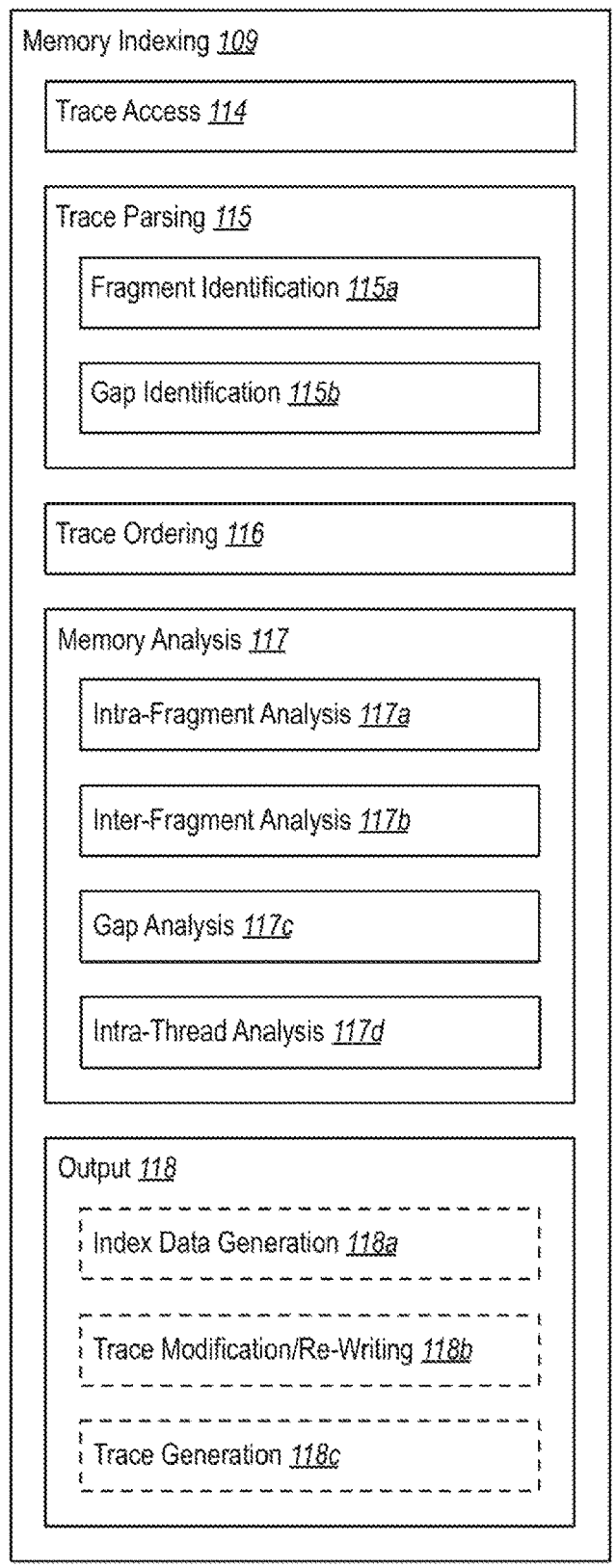
FIG. 1B illustrates additional detail of a memory indexing component of FIG. 1A.

FIG. 1B illustrates an example 100b that provides additional detail of the memory indexing component 109 of FIG. 1A. The depicted memory indexing component 109 in FIG. 1B includes a variety of sub-components (e.g., trace access component 114, trace parsing component 115, trace ordering component 116, memory analysis component 117, output component 118, etc.) that represent various functionalities that the memory indexing component 109 might implement in accordance with various embodiments described herein. It will be appreciated that the depicted components—including their identity, sub-components, and arrangement—are presented merely as an aid in describing various embodiments of the memory indexing component 109, and that these components/sub-components are non-limiting to how software and/or hardware might implement various embodiments of the memory indexing component 109, or of the particular functionality thereof.

The trace access component 114 accesses at least one of the trace(s) 113. This could mean accessing trace(s) 113 from durable storage 104, and/or accessing trace(s) 113 from another computer system (e.g., one or more of computer systems 202). In embodiments, accessing a trace 113 causes that trace to be loaded, at least in part, into system memory 103 (i.e., as shown by trace(s) 113').

The trace parsing component 115 parses the accessed trace(s) 113 to identify at least one or more fragments in the traced execution. Accordingly, FIG. 1B shows that the trace parsing component 115 can include a fragment identification component 115a. As used herein, a "fragment" is one or more consecutive instructions that executed on the same thread, without interruption by any other threads. In embodiments, a fragment might be defined based on sequencing events. For example, a fragment could be a set of consecutive instructions that executed between sequencing events, with a key frame at the beginning of the trace acting as a sequencing event.

Figure 4A:
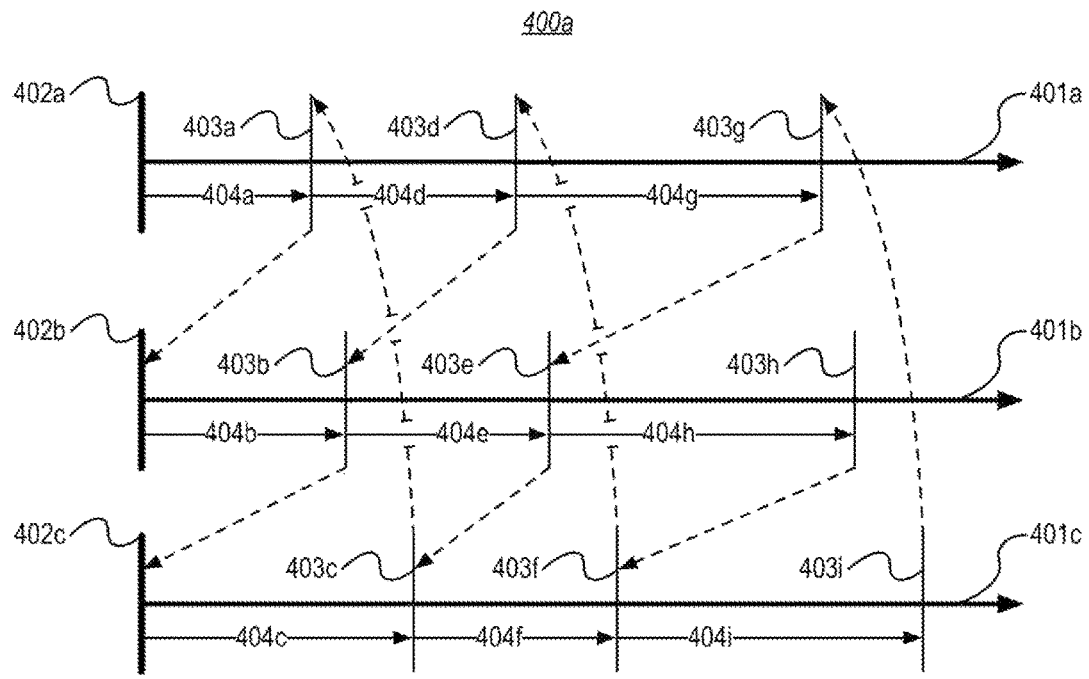
FIG. 4A illustrates an example timing diagram that includes timeliness of execution of three threads, including fragments.

To illustrate, FIG. 4A illustrates an example timing diagram 400a that shows three timelines 401 (i.e., timelines 401a-401c) of execution of three threads, such as the three threads traced into data streams 301 of FIG. 3. While, for simplicity, the threads in timing diagram 400a execute in round-robin manner, it will be appreciated that they would typically execute in a less predictable manner. As shown, each of these timelines 401 begins with a key frame 402 (i.e., key frames 402a-402c) which could, for example, correspond to key frames 303a, 303c, and 303d of FIG. 3. Each of these timelines 401 also includes three sequencing events 403 (i.e., sequencing events 403a-403i), such as the sequencing events 1-9 of FIG. 3. For example, sequencing events 403a, 403d, and 403g on timeline 401a could correspond to sequencing events 1, 4, and 7; sequencing events 403b, 403e, and 403h on timeline 401b could correspond to sequencing events 2, 5, and 8; and sequencing events 403c, 403f, and 403i on timeline 401c could correspond to sequencing events 3, 6, and 9.

Within the context of FIG. 4A, fragments on timeline 401a might include a first fragment comprising the code that executed between key frame 402a and sequencing event 403a (arrow 404a), a second fragment comprising the code that executed between sequencing event 403a and sequencing event 403d (arrow 404d), and a third fragment comprising the code that executed between sequencing event 403d and sequencing event 403g (arrow 404g). Similarly, fragments on timeline 401b might include a first fragment between key frame 402b and sequencing event 403b (arrow 404b), a second fragment between sequencing event 403b and sequencing event 403e (arrow 404e), and a third fragment between sequencing event 403e and sequencing event 403h (arrow 404h); fragments on timeline 401c might include a first fragment between key frame 402c and sequencing event 403c (arrow 404c), a second fragment between sequencing event 403c and sequencing event 403f (arrow 404f), and a third fragment between sequencing event 403f and sequencing event 403i (arrow 404i).

The trace parsing component 115 can also parse the accessed trace(s) 113 to identify one or more gaps in the accessed trace(s) 113. Accordingly, FIG. 1B shows that the trace parsing component 115 can include a gap identification component 115b. In general, a gap is any execution time period for which there is a discontinuity in the trace data, or lack of trace data, for one or more traced threads. In embodiments, gaps can come in two forms: big gaps and small gaps. In embodiments, a big gap occurs in a thread's trace when tracing for that thread ceases for an unknown period of time. This could be, for example, because recording of a thread is suspended for an unknown period of time, or because a recorded thread is terminated and recording later resumes on a different thread. In embodiments, a small gap occurs when recording of a thread is ceased/suspended for a known purpose. For example, a small gap can occur when a thread makes a function call that suspends that thread's execution to execute a non-traced thread.

Figure 5A:
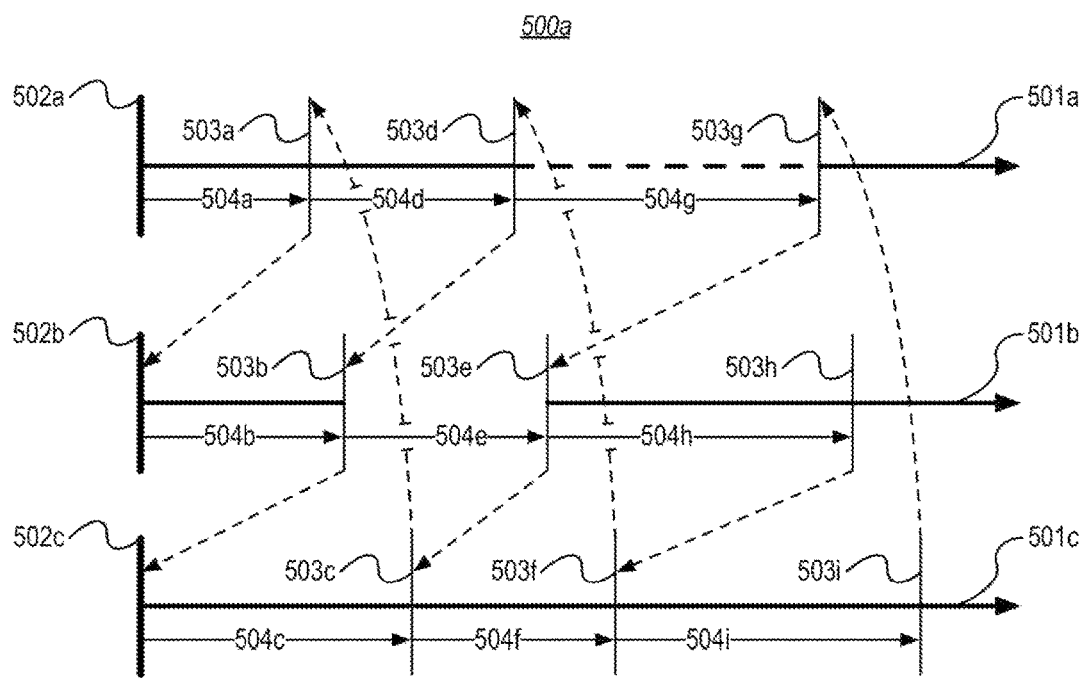
FIG. 5A illustrates an example timing diagram that includes timeliness of execution of three threads, including fragments and gaps.

To illustrate these concepts, FIG. 5A illustrates an example timing diagram 500a that is similar to the timing diagram 400a of FIG. 4A, but which includes examples of big and small gaps. As an example of a big gap that results from recording of a thread being suspended for an unknown period of time, suppose, in FIG. 5A, that the thread corresponding to timeline 501b is responsible for drawing/rendering a user interface window for a traced application 112. If the tracing component 110 ceases recording of that thread due to the user interface window being closed, the tracing component 110 does not know when the user interface will later be opened (and tracing resumed). In embodiments, the gap in tracing of this thread that occurs between the time the window was closed and the time the window was later opened (and tracing resumed) can be considered a big gap. This big gap is represented in FIG. 5A as a gap between sequencing events 503b and 503e in the line representing timeline 501b. An alternate example (not shown) of a big gap might be a time period during which recording for each of the threads corresponding to timelines 501a-501a turned off. During this time period, there would be a big gap in each of the timelines 501.

As an example of a small gap, suppose, in FIG. 5A, that the thread corresponding to timeline 501a is responsible for parsing file data. If that thread makes a call to a kernel function to open the file, and the kernel thread handling the request is not traced, the time period between the traced thread making the kernel call and the kernel call returning to the traced thread can, in embodiments, be considered a small gap. This small gap is represented in FIG. 5A as broken line between sequencing events 503d and 503g in timeline 501a.

Figure 4B:
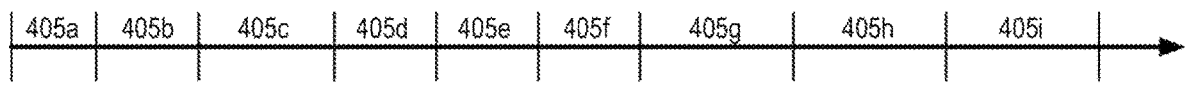
FIG. 4B illustrates an example of one potential total ordering of the fragments in FIG. 4A.

Based on the trace parsing component 115 having identified fragments in the accessed trace(s) 113, the trace ordering component 116 can identify an ordering among these fragments. This is an ordering in which the fragments could be emulated by the emulation component 111. In embodiments, this can be a partial ordering or a total ordering. In a total ordering, each represented instruction in the trace(s) 113 has a defined order relative to the other instructions in the trace(s) 113. In a partial ordering this restriction might be relaxed. For example, due to the inclusion of key frames, and due to two or more fragments having no overlap in their memory accesses, it may be possible that these fragments could be emulated by the emulation component 111 in parallel. FIG. 4B illustrates an example 400b of one potential total ordering of the fragments in FIG. 4A. While it may be possible to order trace fragments in a variety of ways, example 400b orders fragments based on the sequencing number order. For example, in FIG. 4B the trace fragments are shown as 405a, then 405b, then 405c, and so on to fragment 405i. This follows the ordering shown by the arrows in FIG. 4A, beginning at key frame 402a. For example, fragment 405a in FIG. 4B corresponds to the fragment of code that executed between key frame 402a and sequencing event 403a (arrow 404a) in FIG. 4A. Following the broken arrow in FIG. 4A from sequencing event 403a to key frame 402b, fragment 405b in FIG. 4B corresponds to the fragment of code that executed between key frame 402b and sequencing event 403b (arrow 404b) in FIG. 4A. Following the broken arrow in FIG. 4A from sequencing event 403b to key frame 402c, fragment 405c in FIG. 4B corresponds to the fragment of code that executed between key frame 402c and sequencing event 403c (arrow 404c) in FIG. 4A. Following the broken arrow in FIG. 4A from sequencing event 403c to sequencing event 403a, fragment 405d in FIG. 4B corresponds to the fragment of code that executed between sequencing event 403a and sequencing event 403d (arrow 404d) in FIG. 4A. This pattern continues throughout FIG. 4A.

Figure 5B:
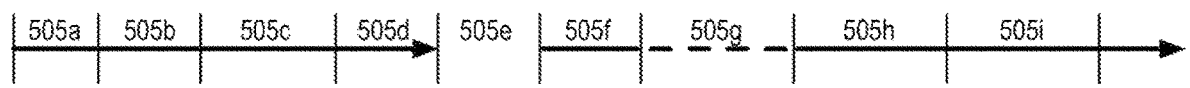
FIG. 5B illustrates an example of one potential total ordering of the fragments and gaps in FIG. 5A.

If gaps were identified by the gap identification component 115b, the trace ordering component 116 can also identify an ordering of these gaps among the ordered fragments. FIG. 5B illustrates an example 500b of one potential total ordering of the fragments and gaps in FIG. 5A. While it may be possible to order trace fragments and gaps in a variety of ways, example 500b also orders fragments and gaps based on the sequencing number order. For example, in FIG. 5B the trace fragments are shown as 505a, then 505b, then 505c, and so on to fragment 505i. This includes ordering a big gap (i.e., 505e) and a small gap (i.e., 505g). Similar to FIG. 4B, this ordering follows the ordering shown by the arrows in FIG. 5A, beginning at key frame 502a.

With fragments and gaps (if any) identified by the trace parsing component 115, and with at least a partial ordering of these fragments and gaps (if any) identified by the trace ordering component 116, the memory analysis component 117 can perform one or more of an intra-fragment analysis, an inter-fragment analysis, or a gap analysis to identify memory cell values that can be presented, during trace emulation, at a time that is earlier than when those memory cell values appeared in the trace(s) 113. Accordingly, in FIG. 1B, the memory analysis component 117 includes an intra-fragment analysis component 117a, an inter-fragment analysis component 117b, and a gap analysis component 117c. Additionally, or alternatively, the memory analysis component 117 can perform an inter-thread analysis to enable efficient thread-focused analysis (e.g., replay, memory queries, etc.), while still being able to present a correct view of memory locations that were interacted with by threads that are not part of the thread-focused analysis. Accordingly, in FIG. 1B, the memory analysis component 117 includes an inter-thread analysis component 117d.

The intra-fragment analysis component 117a analyzes fragments individually to determine if "compatible" memory cell value(s) can be "prefetched" and presented earlier in the fragment during replay/emulation of that fragment than a point at which those memory cell value(s) appear in the trace data for that fragment. In embodiments, the intra-fragment analysis component 117a can identify a given memory cell value as being "compatible" with other values in the fragment by determining if the value is consistent with other prior known values of the memory cell in the fragment. For example, if the memory cell value is the value of a first read from the memory cell within the fragment, that value will clearly be compatible with prior known values of the memory cell in the fragment, since there is no prior known value for the memory cell in the fragment. If, on the other hand, the memory cell value is the value of a subsequent read from the memory cell within the fragment, the value is compatible if it matches the previously-known value for the memory cell in the fragment. The previously-known value can be known due to either a read from the memory cell or a write to the memory cell. Thus, for example, the value obtained from a subsequent read would be compatible if (i) a first read in the fragment obtained the value "A" from the cell, (ii) a subsequent write in the fragment wrote the value "B" to the cell, and (iii) the subject subsequent read obtained the value "B" from the cell. However, the value obtained from the subsequent read would be incompatible if the subsequent read obtained anything other than the value "B" from the cell, because the cell was modified by something other than the fragment (e.g., another thread, hardware direct memory access (DMA), etc.). Thus, for example, if the subsequent read obtained the value "C" from the cell, this value would be incompatible with the prior two values.

Notably, in situations in which there are multiple reads and/or writes from a memory cell, if those reads/writes are compatible they can be "pre-fetched" by pre-fetching only the initial value of the memory cell. For example, in the preceding example, only the value "A" would need to be pre-fetched; the write of the value "B" and the read of the value "B" can be reproduced via emulation of the instructions following the initial read from the memory cell. In the second example of the subsequent read obtaining the value "C", it might be possible to pre-fetch the value "A" obtained by the first read, but not the value "C" obtained by the subsequent read.

Figure 6A:
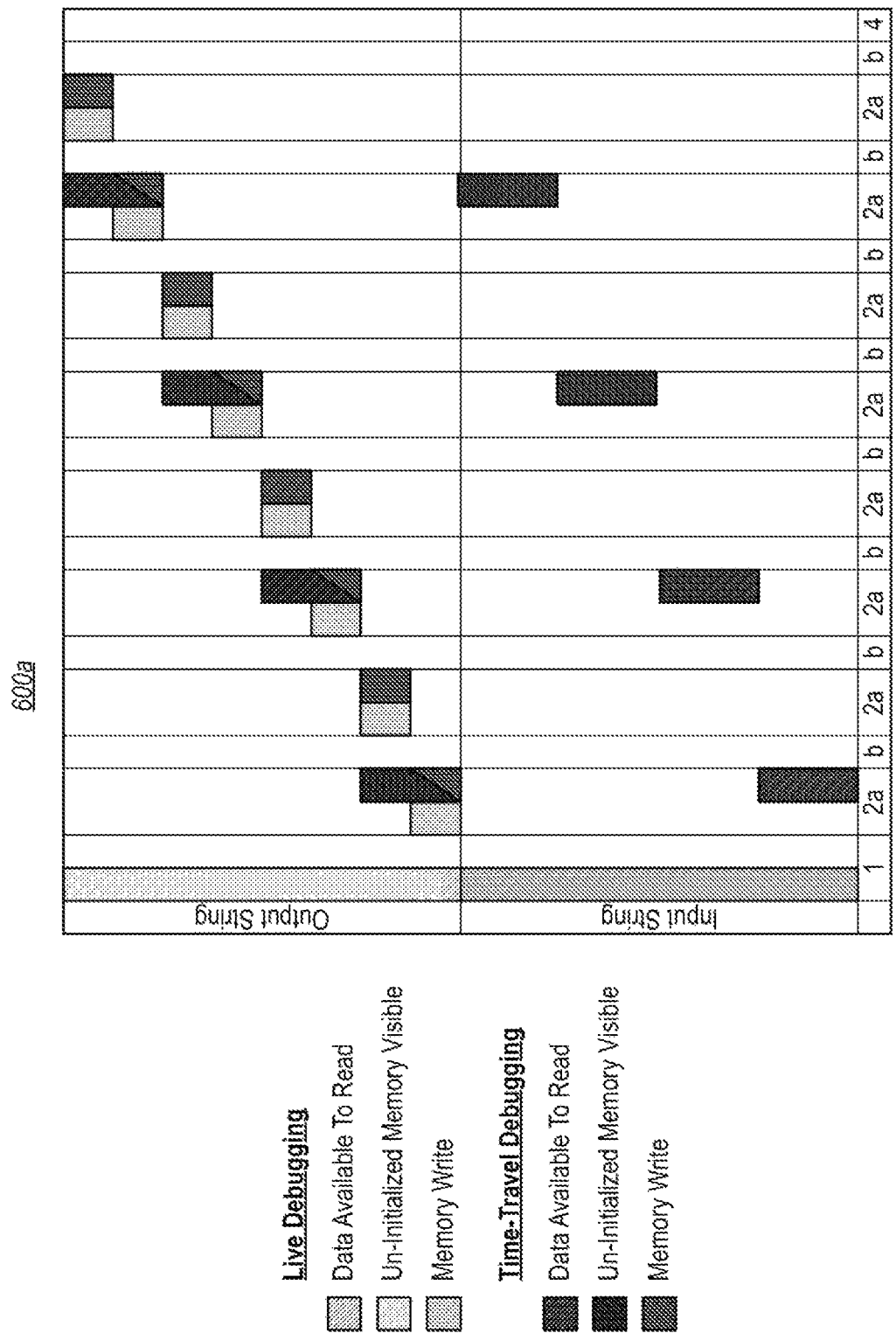
FIG. 6A illustrates an example timing diagram corresponding to execution of a single fragment that performs a string copy, including live and time-travel debugging memory read and write timings.

To demonstrate the concept of pre-fetching within a fragment, FIGS. 6A and 6B illustrate example timing diagrams 600a/600b corresponding to execution of a function that performs a string copy. FIGS. 6A and 6B assume that the entire function executes as a single fragment (i.e., there are no other threads that interrupt its execution, and there are no gaps in its execution). This function includes the following steps:
   1. Set up the function's stack
   2. Begin a loop
      a. Copy a single character
      b. Compare the character with a null terminator to exit
   3. End the loop
   4. Return Timing diagram 600a demonstrates—for both live debugging and time-travel debugging—an example of when memory cell values corresponding to an input string are available to be read (i.e., visible), when un-initialized memory cells corresponding to an output string are visible, and when data is written to the memory cells corresponding to the output string. For example, timing diagram 600a shows that, during live debugging, the memory cell values corresponding to the entire input string may be available to be read, and un-initialized memory cells corresponding to the entire output string may be visible, at step one of the function above (i.e., when the function's stack is set up). By contrast, timing diagram 600a also shows that, during time-travel debugging, the memory cell values corresponding to the input string may only become visible progressively as they are read in step 2a of the loop (e.g., when data packet(s) storing these values appear in the trace), and that the un-initialized memory cells corresponding to the output string may only become visible in connection with writing to those memory cells in step 2a of the loop.

Notably, in timing diagrams 600a/600b (and in subsequent timing diagrams), the visibility of un-initialized memory cell values during time-travel debugging depends on those values being present in the trace when the first action the code performed on a memory cell was a write. Thus, these un-initialized values might be available when the tracing component 110 captures a write to a previously unlogged memory cell as a read from the memory cell plus a write to the memory cell (e.g., instead of performing the write without logging anything). As such, the availability of the values of un-initialized memory cells during time-travel debugging is dependent on them being in the trace, but their availability (or lack thereof) doesn't impact correctness during trace replay. For example, if values of un-initialized memory cells are not available in the trace, a debugger could display that unknown data as a question mark, a random value, a defined pattern, etc.

In embodiments, the intra-fragment analysis component 117a might determine that the memory cell values corresponding to the input string that were read during time-travel debugging in steps 2a are compatible with other values of those memory cells in the fragment, and therefore determine that these memory cell values can be "prefetched" and made visible, during emulation/replay, at a point that is earlier in the fragment—such as at the beginning of the fragment. In addition, the intra-fragment analysis component 117a might determine that the memory cell values corresponding to un-initialized memory are compatible with other values of those memory cells in the fragment, and therefore determine that these this un-initialized memory can also be made visible, during emulation/replay, at a point that is earlier in the fragment—such as at the beginning of the fragment. Thus, turning to FIG. 6B, timing diagram 600b shows that these memory cells can be made visible at the beginning of the fragment during time-travel debugging (i.e., during step 1 of the function, just like during live debugging). In particular, the various broken arrows and broken boxes in connection with the input string show that memory cell values corresponding to reads can be prefetched from their natural time position in the trace and be made visible at the beginning of the fragment (i.e., step 1) during replay/emulation of the fragment; the various arrows and broken boxes in connection with the output string also show that un-initialized memory cell values might also be made visible at the beginning of the fragment (i.e., step 1) during replay/emulation of the fragment.

Figure 7A:
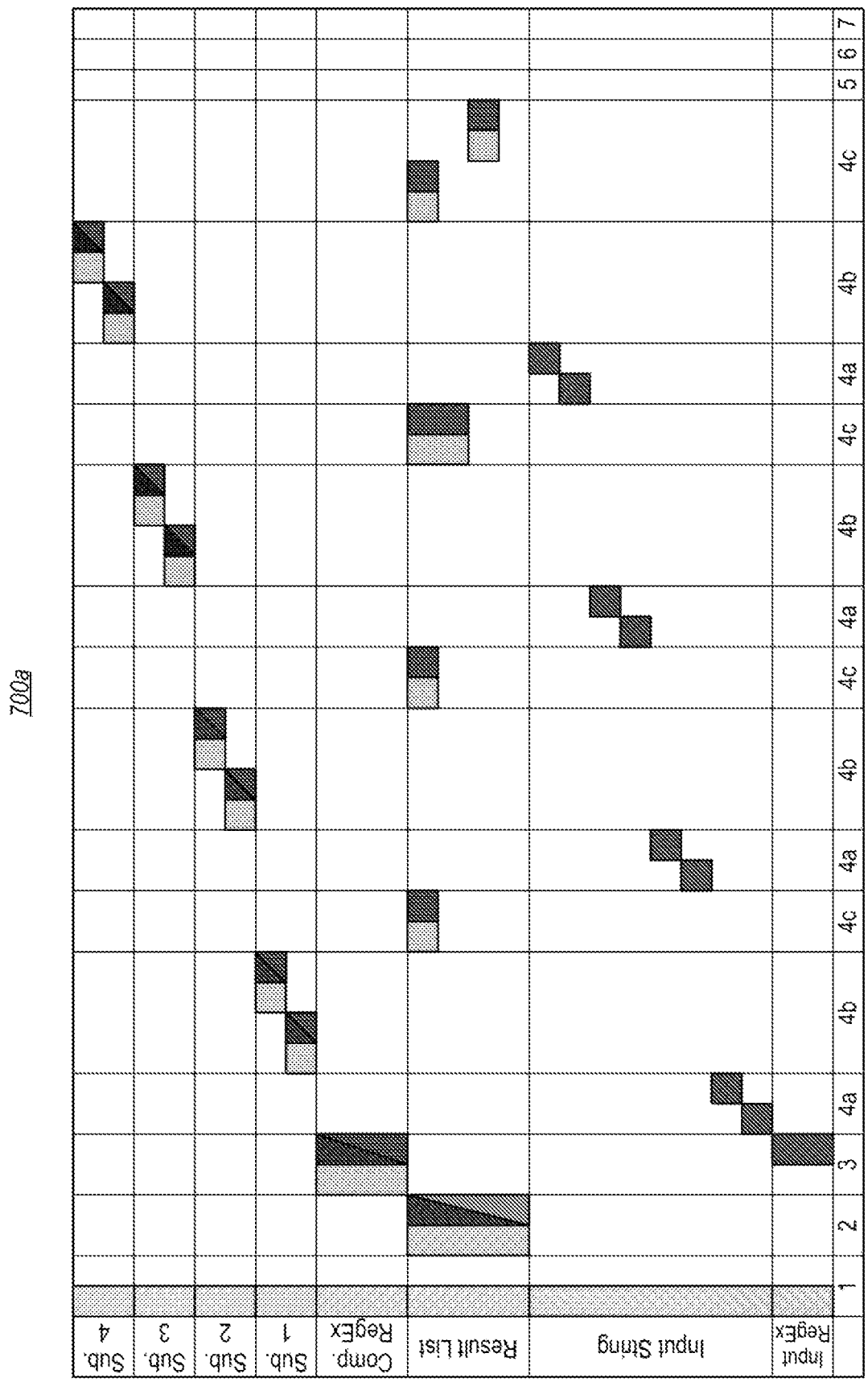
FIG. 7A illustrates an example timing diagram corresponding to execution of a single fragment that performs a string copy, including live and time-travel debugging memory read and write timings.
Figure 7B:
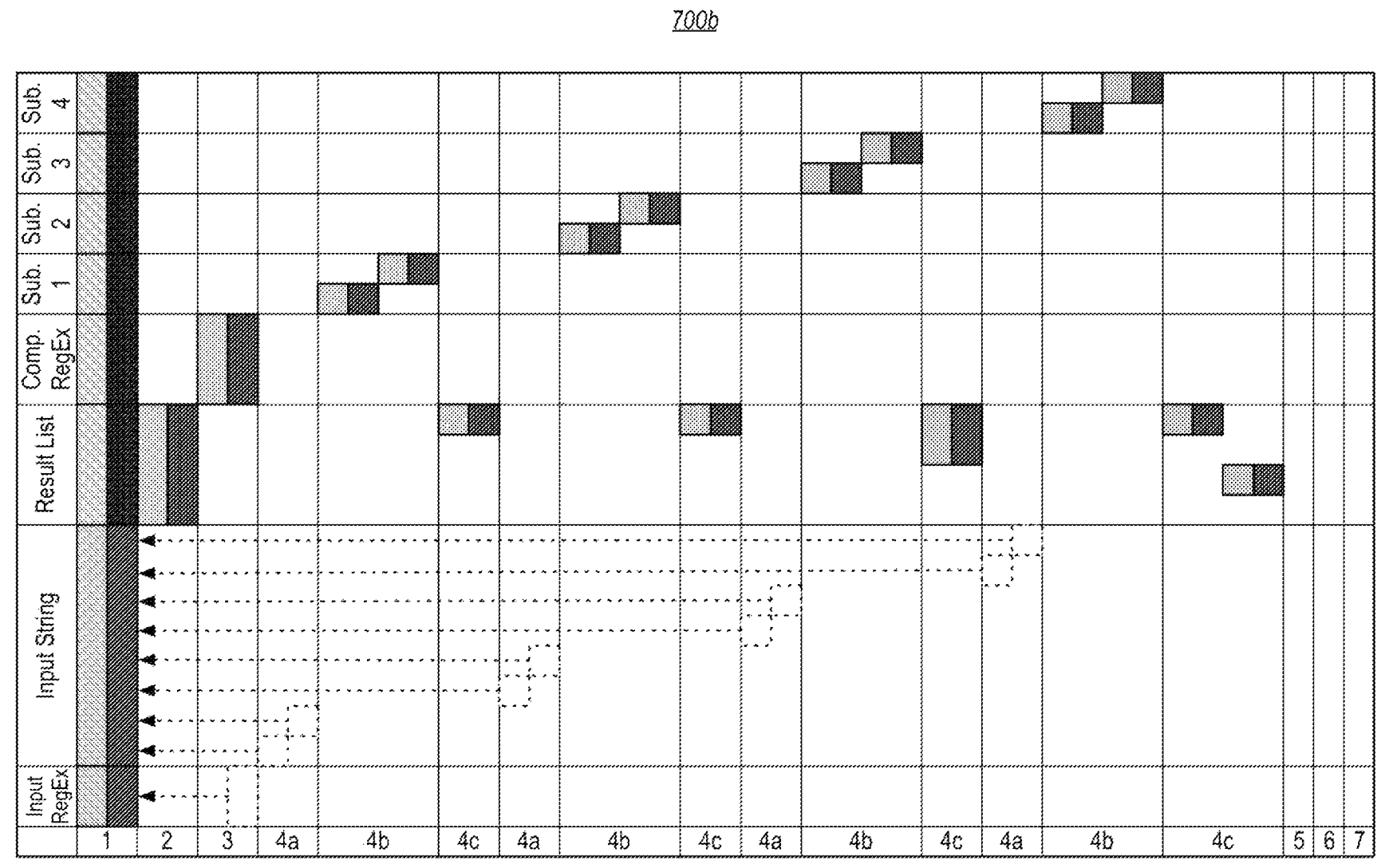

FIGS. 7A and 7B provide another example of prefetching values within a fragment. In particular, FIGS. 7A and 7B illustrate example timing diagrams 700a/700b corresponding to execution of a function that splits a string into pieces based on regular expression (RegEx) matches. Notably, the meaning of the various shadings, as defined in FIGS. 6A and 6B, applies to FIGS. 7A and 7B. Again, FIGS. 7A and 7B assume that the entire function executes as a single fragment. This function includes the following steps:
1. Set up the function's stack
2. Allocate memory for a results list
3. Call a function to compile the regular expression
4. Begin a loop
    a. Call a function to find the position of the next RegEx match in the string
    b. Call a function to create a new string from the substring match found before
    c. Append string to result
5. End the loop
6. Prepare a returned list
7. Return Similar to timing diagram 600a, timing diagram 700a demonstrates—for both live debugging and time-travel debugging—an example of when memory cell values corresponding to reads and un-initialized memory might be visible. Like timing diagram 600a, timing diagram 700a shows that, during live debugging, the memory cell values that will be read by the function (i.e., the input regular expression and the input string), as well as un-initialized memory cells that will be written to by the function (i.e., the result list, the compiled regular expression, and sub-strings) are visible at entry of the function (i.e., at step 1 above). Also similar to timing diagram 600a, timing diagram 700a also shows that, during time-travel debugging, the memory cell values corresponding to the reads (i.e., the input regular expression and the input string) may only become visible progressively as they are read in steps 3 and 4a, and that the un-initialized memory cells corresponding to the writes (i.e., the result list, the compiled regular expression, and sub-strings) may only become visible in connection with writing to those memory cells in steps 2, 3, 4b, and 4c. Turning to FIG. 7B, timing diagram 700b shows that these memory cells might be able to be made visible earlier in the fragment during time-travel debugging (e.g., at the beginning of the fragment) during step 1 of the function—just like during live debugging. For example, the various broken arrows and broken boxes in FIG. 7B show that memory cell values corresponding to reads can be prefetched from their natural time position in the trace and be made visible at the beginning of the fragment (e.g., in step 1) during replay/emulation of the fragment. FIG. 7B also shows that the un-initialized memory cells might also be made visible at the beginning of the fragment (e.g., in step 1) during replay/emulation of the fragment, though FIG. 7B does not expressly show movement of this un-initialized memory via broken arrows or broken boxes.

While the intra-fragment analysis component 117a identified memory cell values that could be pre-fetched and exposed earlier in the fragment than where they occurred in a trace of the fragment, the inter-fragment analysis component 117b identifies memory cell values that can be pushed across fragments. In embodiments, the inter-fragment analysis component 117b might operate on fragments after the intra-fragment analysis component 117a has operated on them, though it might also be possible for the inter-fragment analysis component 117b to operate independent of the intra-fragment analysis component 117a.

The inter-fragment analysis component 117b operates by determining if a given memory cell value in one fragment is compatible with one or more prior fragments. While the intra-fragment analysis component 117a determined intra-fragment compatibility of a given memory cell value with values of the memory cell seen previously in the same fragment, the inter-fragment analysis component 117b determines compatibility of a given memory cell value with memory values seen in one or more prior fragments. Thus, similar to the intra-fragment compatibility analysis, the inter-fragment compatibility analysis also determines compatibility of a memory cell value with values that were seen prior (in execution time). In embodiments, the inter-fragment analysis component 117b can identify a memory cell value in a particular fragment as being "compatible" with an adjoining prior fragment by determining if the prior fragment touches that memory cell. If the prior fragment does not touch that memory cell, then the value is compatible with the prior fragment and it can be pushed across the prior fragment (e.g., it can be exposed at the beginning of the prior fragment). If, on the other hand, the prior fragment does touch that memory cell, then the memory cell value is compatible with the prior fragment only if the value of the memory cell at the end of the prior fragment is the same as the value of the memory cell at the beginning of the particular fragment. In embodiments, the inter-fragment analysis component 117b might determine that a memory cell value is compatible with multiple prior fragments. Thus, it might be possible to push a memory cell value across a series of fragments that are each compatible with the memory cell value.

To demonstrate the concept of pushing memory cell values across fragments, FIGS. 8A-8D illustrate example timing diagrams 800a-800d corresponding to execution of the function discussed in connection with FIGS. 7A and 7B (i.e., which splits a string into pieces based on regular expression matches). Notably, the meaning of the various shadings, as defined in FIGS. 6A and 6B, applies to FIGS. 8A-8D. Unlike FIGS. 7A and 7B, in FIGS. 8A-8D the function does not execute as a single fragment. Instead, as shown at step "F," execution of this function is interrupted by another traced thread that has no overlapping memory accesses (as determined by the thread's trace). Thus, in FIGS. 8A-8D, there are three fragments—a first fragment comprising execution of the function until step F (i.e., step 1 to the second instance of step 4b), a second fragment comprising step F itself, and a third fragment comprising execution of the function after step F (i.e., the second instance of step 4C to step 7).

Timing diagram 800a demonstrates—for both live debugging and time-travel debugging—an example of when memory cell values corresponding to reads and un-initialized memory might be visible. Timing diagram 800a is identical to timing diagram 700a, except for the presence of the fragment at step F. Thus, memory visibility in timing diagram 800a is the same for live debugging and time-travel debugging as those visibilities were described in connection with FIG. 7A.

Figure 8A:
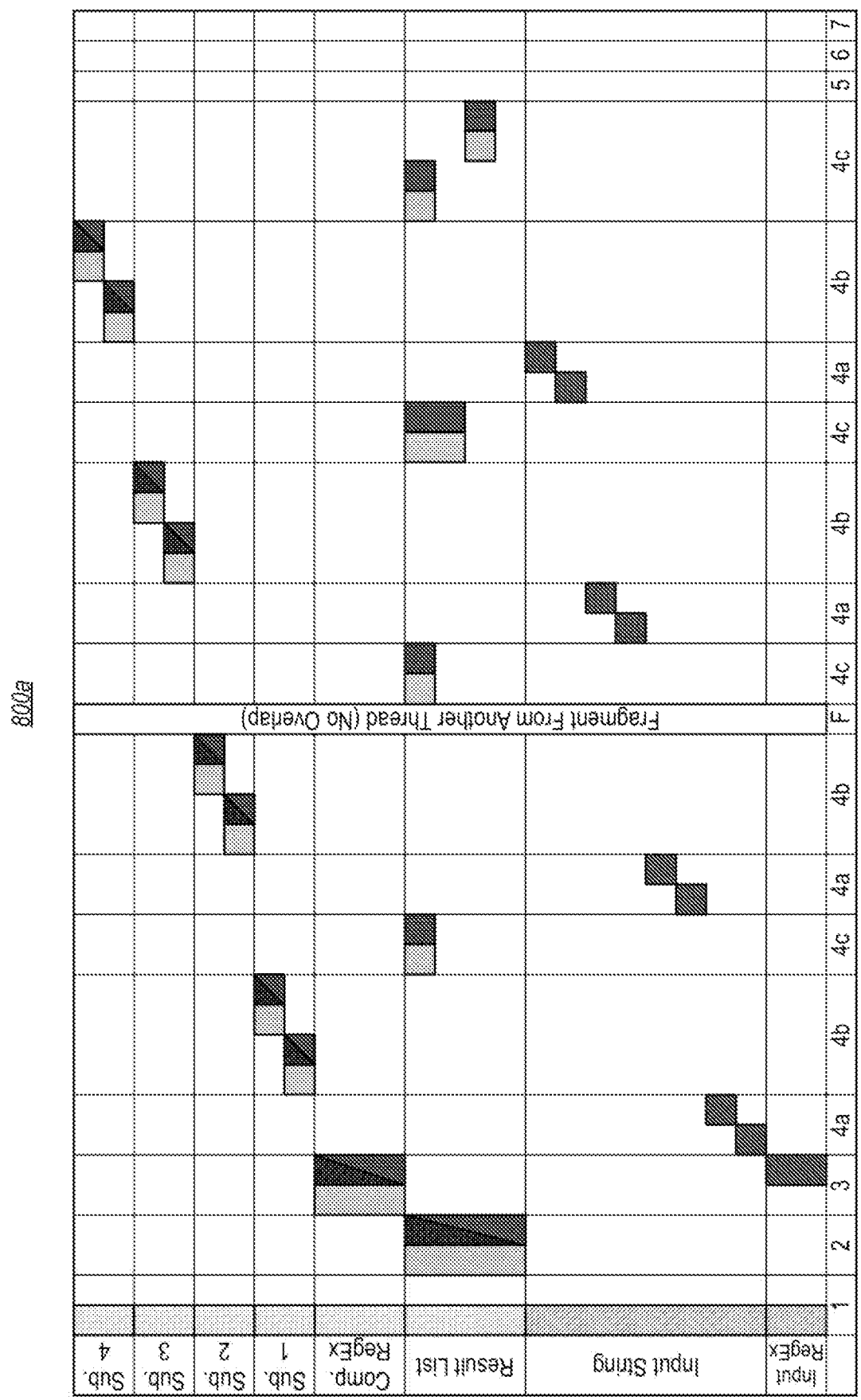
FIG. 8A illustrates an example timing diagram corresponding to execution of multiple fragments that split a string into pieces based on regular expression matches and which includes a fragment from another thread, including live and time-travel debugging memory read and write timings.
Figure 8B:
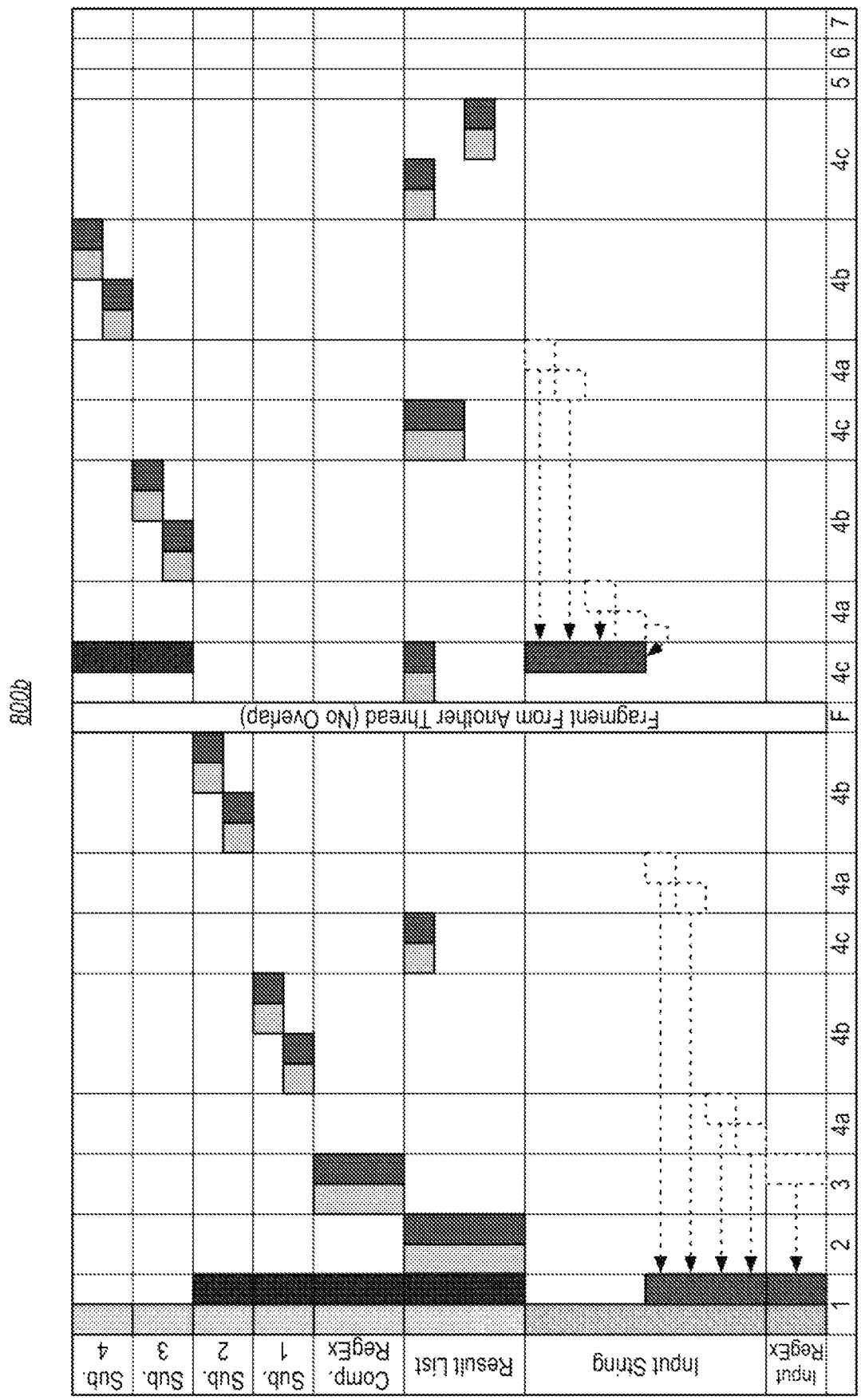
FIG. 8B illustrates an example timing diagram corresponding to execution of multiple fragments that split a string into pieces based on regular expression matches and which includes a fragment from another thread, including performing intra-fragment memory movement.

Turning to FIG. 8B, timing diagram 800b demonstrates that, for time-travel debugging, the intra-fragment analysis component 117a can identify compatible memory cell values that can be exposed at the beginning of each fragment. For example, the broken arrows and broken boxes in FIG. 8B show that memory cell values in the first fragment (i.e., corresponding to reads from the input regular expression and the input string) can be prefetched from their natural time position in the trace and be made visible at the beginning of the first fragment (e.g., in step 1) during replay/emulation of the first fragment. Similarly, the broken arrows and broken boxes in FIG. 8B also show that memory cell values in the third fragment (i.e., corresponding to reads from the input string) can be prefetched from their natural time position in the trace and be made visible at the beginning of the third fragment (e.g., in the first instance of step 4C in that fragment) during replay/emulation of the third fragment. FIG. 8B also shows that the un-initialized memory cells might also be made visible at the beginning of these fragments (e.g., in step 1 for the first fragment, and in step 4C of the third fragment) during replay/emulation of those fragments, though FIG. 8B does not expressly show movement of this un-initialized memory via broken arrows or broken boxes.

Figure 8C:
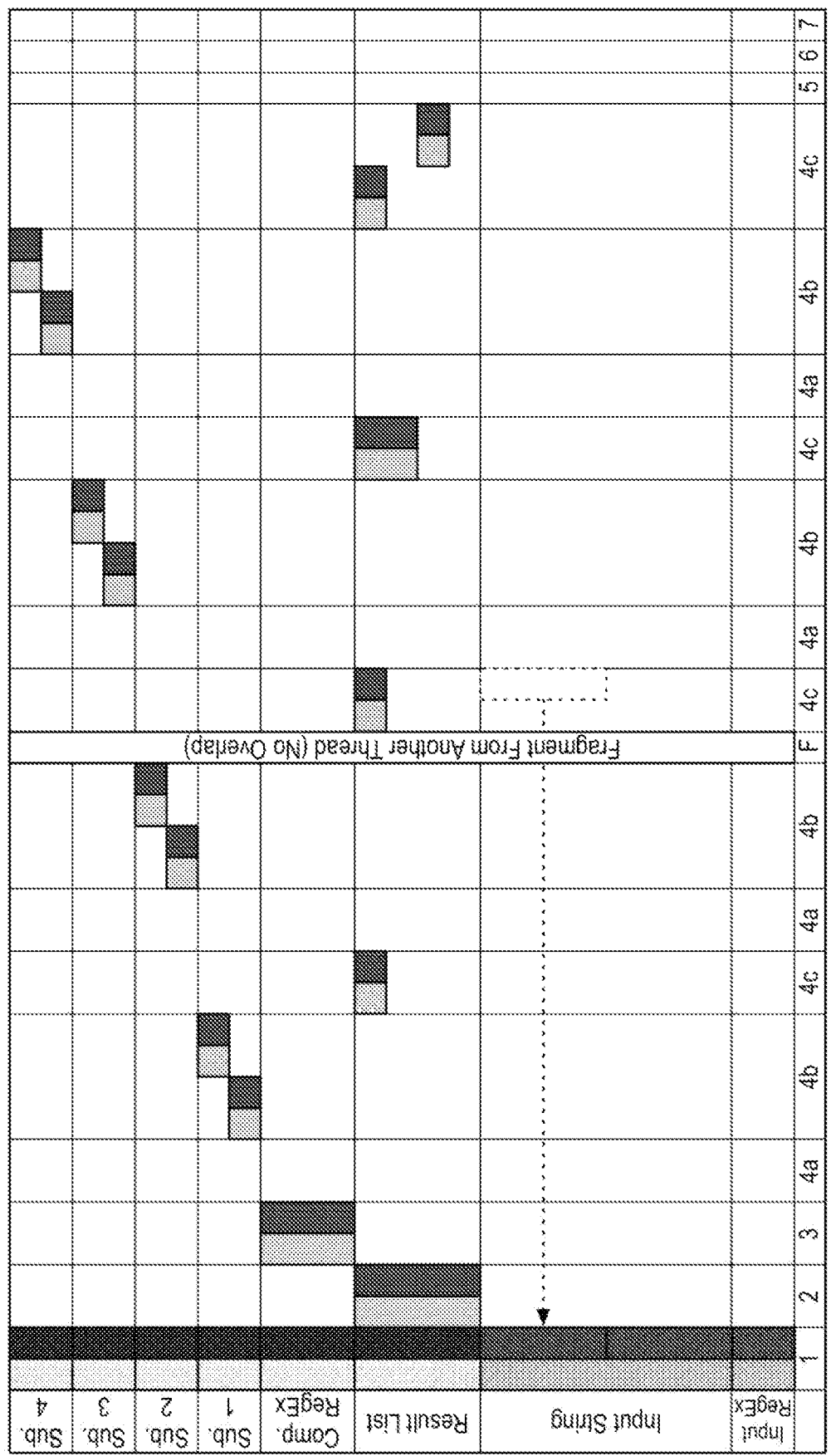
FIG. 8C illustrates an example timing diagram corresponding to execution of multiple fragments that split a string into pieces based on regular expression matches and which includes a fragment from another thread, including performing inter-fragment memory movement after the intra-fragment memory movement of FIG. 8B.

Turning to FIG. 8C, timing diagram 800c demonstrates that, for time-travel debugging, the inter-fragment analysis component 117b can further determine that the pre-fetched memory cell values at the beginning of the third fragment (i.e., now in step 4c of the third fragment) are compatible with the second fragment (which has no overlapping memory accesses) and can thus be pushed across—and exposed prior to—the second fragment. Additionally, timing diagram 800c demonstrates that, because these memory cell values are also compatible with the first fragment, they can be pushed to the beginning of the first fragment (i.e., to step 1). FIG. 8C also shows that the un-initialized memory cells can also be pushed across the second fragment to the beginning of the first fragment, though FIG. 8C does not expressly show movement of this un-initialized memory via broken arrows or broken boxes.

Figure 8D:
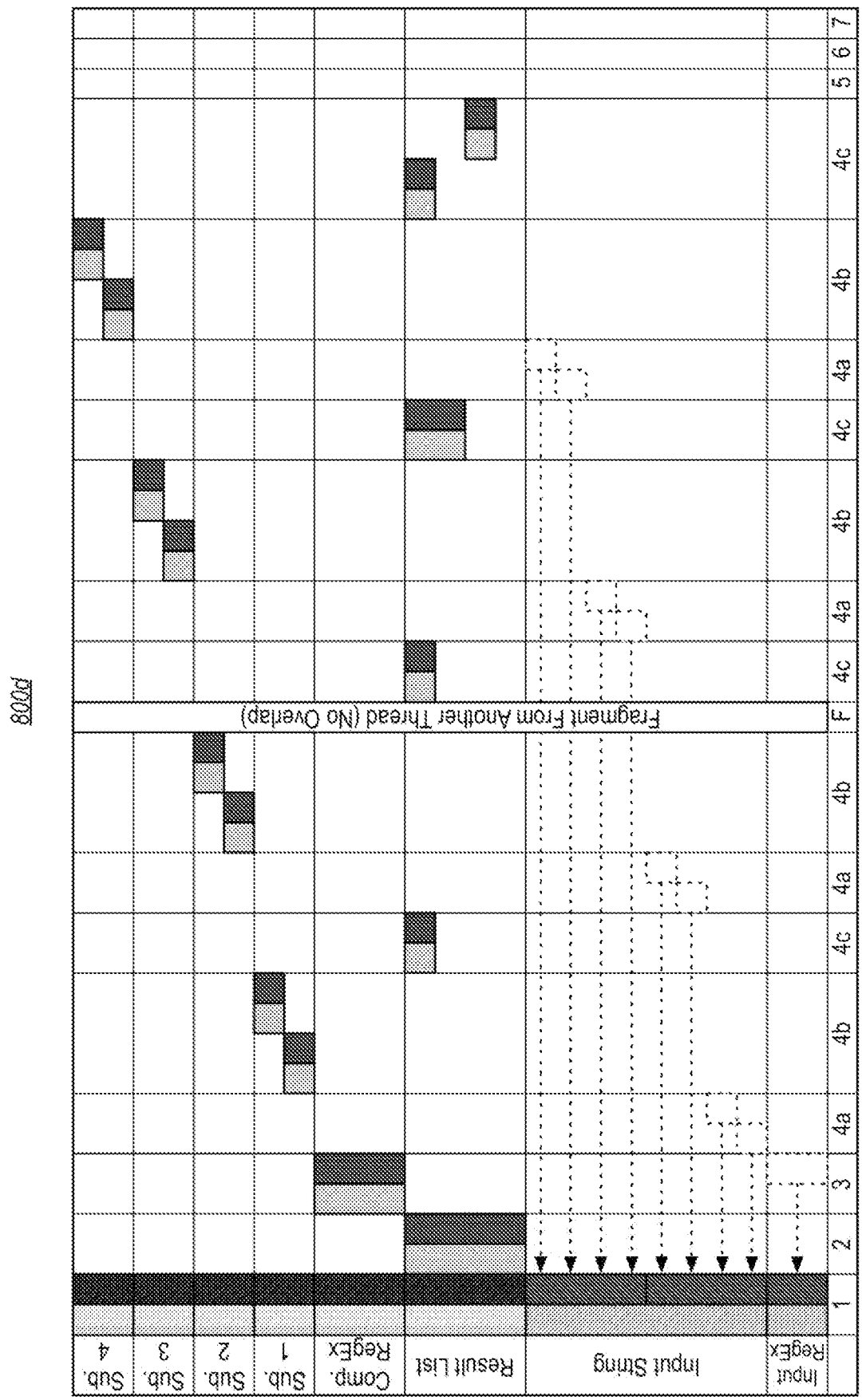
FIG. 8D illustrates an example timing diagram corresponding to execution of multiple fragments that split a string into pieces based on regular expression matches and which includes a fragment from another thread, and shows overall memory movement versus FIG. 8A.

Turning to FIG. 8D, the broken arrows and broken boxes in timing diagram 800d shows the overall movement of memory cell values corresponding to the reads from the input regular expression and the input string. This includes intra-fragment movement of memory cell values from within the first fragment to the beginning of the first fragment and inter-fragment movement of memory cell values from the third fragment, across the second fragment, and to the beginning of the first fragment.

In embodiments, a trace 113 could include full or partial memory snapshots. If these are present, the memory analysis component 117 might treat a memory snapshot as a fragment that is simply a series of reads (i.e., reads from the memory cells that are part of the snapshot). Thus, the inter-fragment analysis component 117b might determine compatibility of a given memory cell value in a fragment that follows a memory snapshot by comparing it with the memory cell were affected by the memory snapshot. If compatible, the fragment analysis component 117b might determine that the memory cell value could be pushed across the memory snapshot.

The gap analysis component 117c determines whether or not a memory cell value can be pushed across a gap in trace recording. Similar to pushing memory cell values across fragments, this involves the gap analysis component 117c determining whether or not the memory cell value is compatible with the gap. While this analysis is fairly straight-forward for fragments (i.e., because there is trace data for the fragment), the lack of information about what happened during the gap can complicate the analysis. In embodiments, due to this lack of information, the gap analysis component 117c performs one or more of heuristic analysis of the gap to infer what memory the gap may have touched.

As mentioned, there are two primary categories of gaps: big gaps in which tracing for a thread ceased without knowing—at the time that tracing had ceased—when it would resume again, and small gaps in which recording of a thread is suspended for a known purpose. In some embodiments, the gap analysis component 117c considers big gaps to always be incompatible, and thus it does not attempt to push memory cell values across big gaps. In other embodiments, however, the gap analysis component 117c might use "domain-specific" knowledge of the non-traced code that executed during a big gap to push memory cell values across big gaps. Examples of such domain-specific knowledge are discussed below. For small gaps, the gap analysis component 117c might perform one or more different types of heuristic analysis. Five example heuristics are provided herein, though the gap analysis component 117c is not limited to using these types of analysis, and need not even support each of these types of analysis.

In first example heuristic, referred to herein as an "individual line movement analysis," is a fairly naïve heuristic that assumes that small gaps don't modify memory, and thus that memory cell values can be pushed across gaps. Since this heuristic is making a compatibility decision for a gap without relying on specific knowledge of potential behaviors of the gap, it is possible that this heuristic might cause some memory cell values to be incorrectly pushed across a gap. Thus, during time-travel debugging, the value of a memory cell might actually be made visible prior to when it would actually be valid. However, in many situations, doing so may not cause significant confusion. For example, a variable that exposes the memory cell might be out of scope and thus be hard to reach, or the memory cell value might simply be replacing un-initialized data earlier than it should. Notably, during live debugging it is fairly common to see what looks like valid data in memory locations that are uninitialized (e.g., in memory locations corresponding to the stack, due to those memory locations being written by previous function invocations); having un-initialized data be available earlier than it should would look similar to this to the user.

In second example heuristic, referred to herein as an "annotation-based analysis," the gap analysis component 117c leverages metadata associated with non-traced code that executes during a gap to determine if that non-traced code touches, or could touch, one or more memory cells for which compatibility is being analyzed. Example metadata includes Source code Annotation Language (SAL) annotations, contracts, and the like. As a first example, an annotation might indicate which memory buffer(s) are received as input by a function that executed during the gap, and which are used as an output of the function. In this case, if the subject memory cell(s) are part of the output buffer, the gap analysis component 117c might determine that those memory cells are not compatible with the gap. Alternatively, if the subject memory cell(s) are not part of the output buffer, the gap analysis component 117c might determine that those memory cells are compatible with the gap. As a second example, a method that executed during the gap might be annotated as an invariant method that, by contract, would require that the memory cell value remain constant. For instance, given class Foo below,

```
class Foo {
    public int AlwaysZero { get; private set; }
    public int OtherValue { get; private set; }
    public Foo(int otherValue) { this.AlwaysZero = 0; this. OtherValue =
        otherValue; }
    [ContractInvariantMethod]
    protected void ObjectInvariant( ) {
        Contract.Invariant(0 == this.always_zero);
    }
    public Bar( ) {
        Contract.Ensures(Contract.OldValue(this.OtherValue) ==
        this.OtherValue);
    }
}
``` if a call to non-traced code during a gap was a call to member function Bar( ), and if the subject memory cell corresponded to either AlwaysZero or OtherValue, the contract could be used to determine that the subject memory cell value is compatible with the gap. As a third example, a postcondition annotation to a function that executed during the gap might require that a buffer corresponding to the subject memory cell have the same value upon function exit as upon function entry. Thus, the postcondition annotation would be used to determine that the subject memory cell value is compatible with the gap. As a fourth example, non-traced code that executed during the gap might be annotated as having no side-effects (i.e., no externally visible side effects at an API level), and thus this annotation could be used to determine that the subject memory cell value is compatible with the gap when it is determined that the memory cell value is not internal to the non-traced code.

In a third example heuristic, referred to herein as an "allocation-based analysis," the gap analysis component 117c determines if the memory cell(s) for which compatibility is being analyzed are part of some allocated memory buffer (e.g., part of a data structure). If so, the gap analysis component 117c may treat the memory buffer as a single unit and determine compatibility of the buffer—as a whole— with the gap. For example, suppose there is no specific knowledge of whether or not a first memory cell is compatible with a gap, but there is knowledge of whether or not a second memory cell is compatible with the gap. If the gap analysis component 117c determines that the first and second memory cells are part of the same buffer, then the first memory cell can be determined to have the same compatibility with the gap as the second memory cell. Thus, for instance, if the gap analysis component 117c determines that the second memory cell is compatible with the gap (e.g., based on another heuristic), it might determine that the first memory cell is compatible with the gap as well. Alternatively, if the gap analysis component 117c determines that the second memory cell is not compatible with the gap, it might determine that the first memory cell is also not compatible with the gap. Notably, if no allocation is expressly observed, some embodiments might treat the first appearance of a pointer to a memory buffer as an allocation.

In a fourth example heuristic, referred to herein as an "allocation-as-annotation-based analysis," the gap analysis component 117c determines that a memory cell is incompatible with a gap if a function that executes during the gap takes as a parameter a pointer to an allocated buffer that includes the memory cell. More generally, when this fourth heuristic is combined with the third heuristic (i.e., an allocation-based analysis), the gap analysis component 117c might determine that the entire buffer is incompatible with the gap. This heuristic is based on an observation that a gap that takes an allocated buffer as a parameter is far more likely to modify the buffer than a gap that that did not take the allocated buffer as a parameter. Thus, for instance, if there are two or more gaps that could have modified a buffer, and one of them takes the buffer as a parameter while the other(s) do not, it is more likely that the one that took the buffer as a parameter was the one that modified the buffer than it is that the other gap(s) modified the buffer. Thus, the gap analysis component 117c might determine that the memory cells in the buffer are incompatible with the gap that took the buffer as a parameter. As an example of use of this fourth heuristic, suppose there are N gaps, N+1 sets of fragments around those gaps (including a set of fragments before the first gap, and after the last gap), and two buffers that are being analyzed for compatibility with the gaps. Of those buffers, the first is compatible between the first fragment and the last fragment, while the second buffer is not. Because the first buffer is compatible with all the fragments, the gap analysis component 117c might determine that it is also compatible with all the gaps, and that it can therefore be pushed forward across all the gaps (e.g., to the first fragment). For the second buffer, the gap analysis component 117c might determine which gap(s) take the second buffer as a parameter, and if there is only one, then the gap analysis component 117c might determine that the second buffer is compatible with any gaps after this gap, but not with any gaps prior to this gap. Even if the second buffer is not seen in the trace, by value, until the last fragment, use of a pointer to that buffer by an intermediate fragment can be a clue that this intermediate fragment could have modified the buffer.

In a fifth example heuristic, referred to herein as a "domain-specific knowledge analysis," the gap analysis component 117c uses some other knowledge of non-traced code that executed during a gap to determines whether or not a subject memory cell value is compatible with the gap. As alluded to above, this heuristic might also be used to determine compatibility with big gaps. As an example, memory storing library code tends not to change (e.g., because code is generally read-only). Thus, the gap analysis component 117c might determine that memory cells corresponding to this loaded library code might be permitted to cross gaps (e.g., between library load and unload events). As another example, it is generally understood how a stack behaves on a given processor architecture and operating system. Using this understanding, the gap analysis component 117c might determine that memory cells below the current stack pointer are incompatible with the gap. As another example, the gap analysis component 117c might determine that the non-traced code corresponded to execution of a pure function (i.e., in which the function's return value is the same for the same arguments, and in which the function's evaluation has no side effects), and thus that the subject memory cell value is compatible with the gap. As yet another example, the gap analysis component 117c might determine that the non-traced code that executed during a gap uses the common language runtime (CLR) of the .NET framework, which includes some forms of metadata that is append-only. Since the metadata is append-only, any memory cells used by the metadata are usually written to only once, and thus the gap analysis component 117c might determine that these memory cells are compatible with the gap (i.e., since their values generally don't change once initially written).

To demonstrate the concept of pushing memory cell values across gaps, FIGS. 9A-9E illustrate example timing diagrams 900a-900e corresponding generally to execution of the function discussed in connection with FIGS. 7A and 7B (i.e., which splits a string into pieces based on regular expression matches). Notably, the meaning of the various shadings, as defined in FIGS. 6A and 6B, applies to FIGS. 9A-9E. Similar to FIGS. 8A-8D, in FIGS. 9A-9E the function also does not execute as a single fragment. Instead, in step 3 (i.e., which calls a function to compile the regular expression) the called function is not traced—resulting in a tracing gap. Thus, in FIGS. 9A-9E, there are two fragments separated by a small gap. These fragments include a first fragment comprising execution of steps 1 and 2, and a second fragment comprising execution of steps 4a-7. These fragments are separated by the small gap at step 3.

Timing diagram 900a demonstrates—for both live debugging and time-travel debugging—an example of when memory cell values corresponding to reads and un-initialized memory might be visible. Timing diagram 900a similar to timing diagram 700a, except for the presence of the gap at step 3. Thus, memory visibility in timing diagram 900a similar for live debugging and time-travel debugging as those visibilities were described in connection with FIG. 7A, except that the input regular expression is not seen during time-travel debugging (since it was consumed by the gap) and that the compiled regular expression (which is the output of the gap and is thus now a read instead of a write) is fully visible at the first instance of step 4a for live debugging, but is only progressively visible for time-travel debugging (i.e., the first and third instances of step 4a).

Figure 9A:
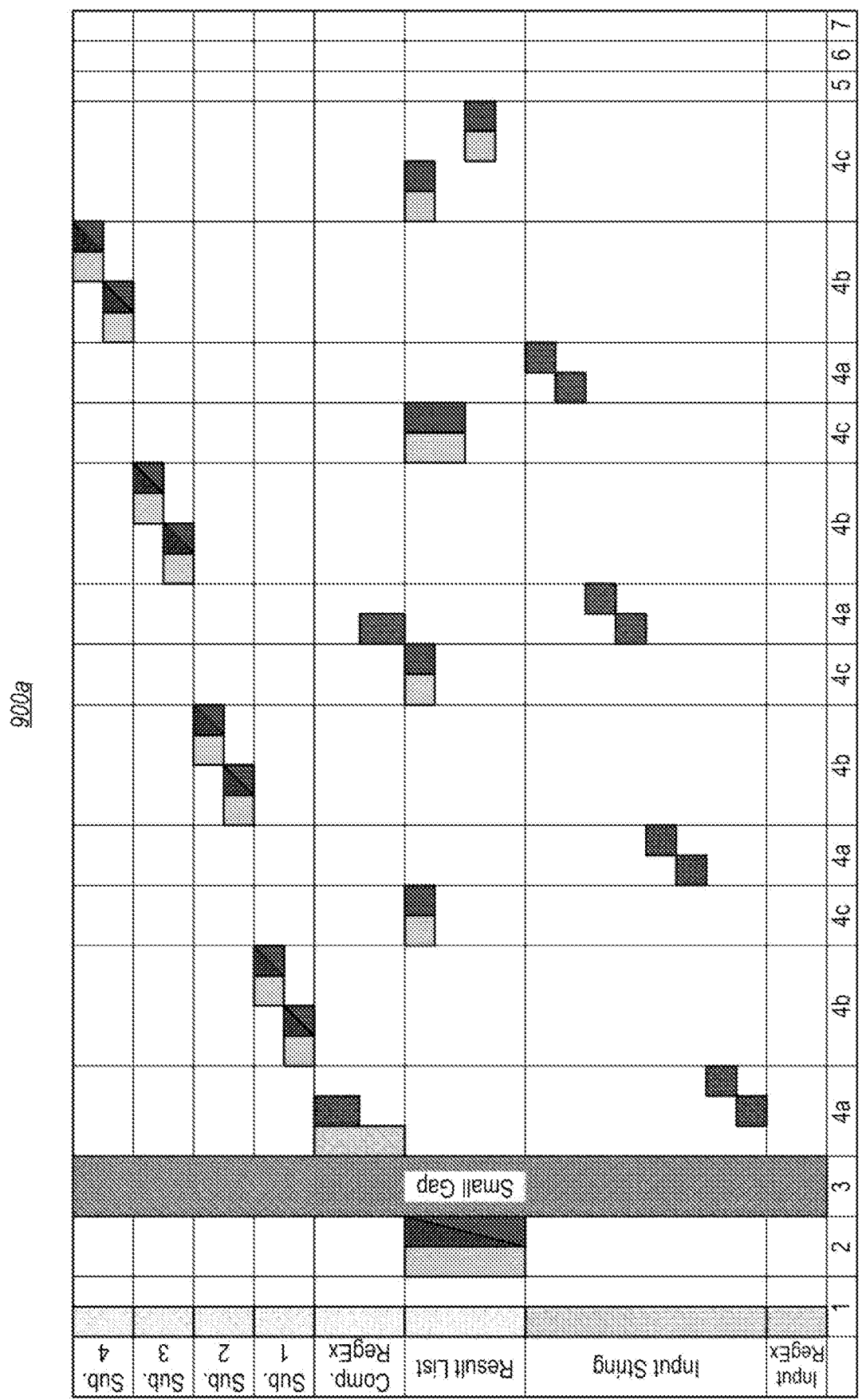
FIG. 9A illustrates an example timing diagram corresponding to execution of multiple fragments that split a string into pieces based on regular expression matches and which includes a gap, including live and time-travel debugging memory read and write timings.
Figure 9B:
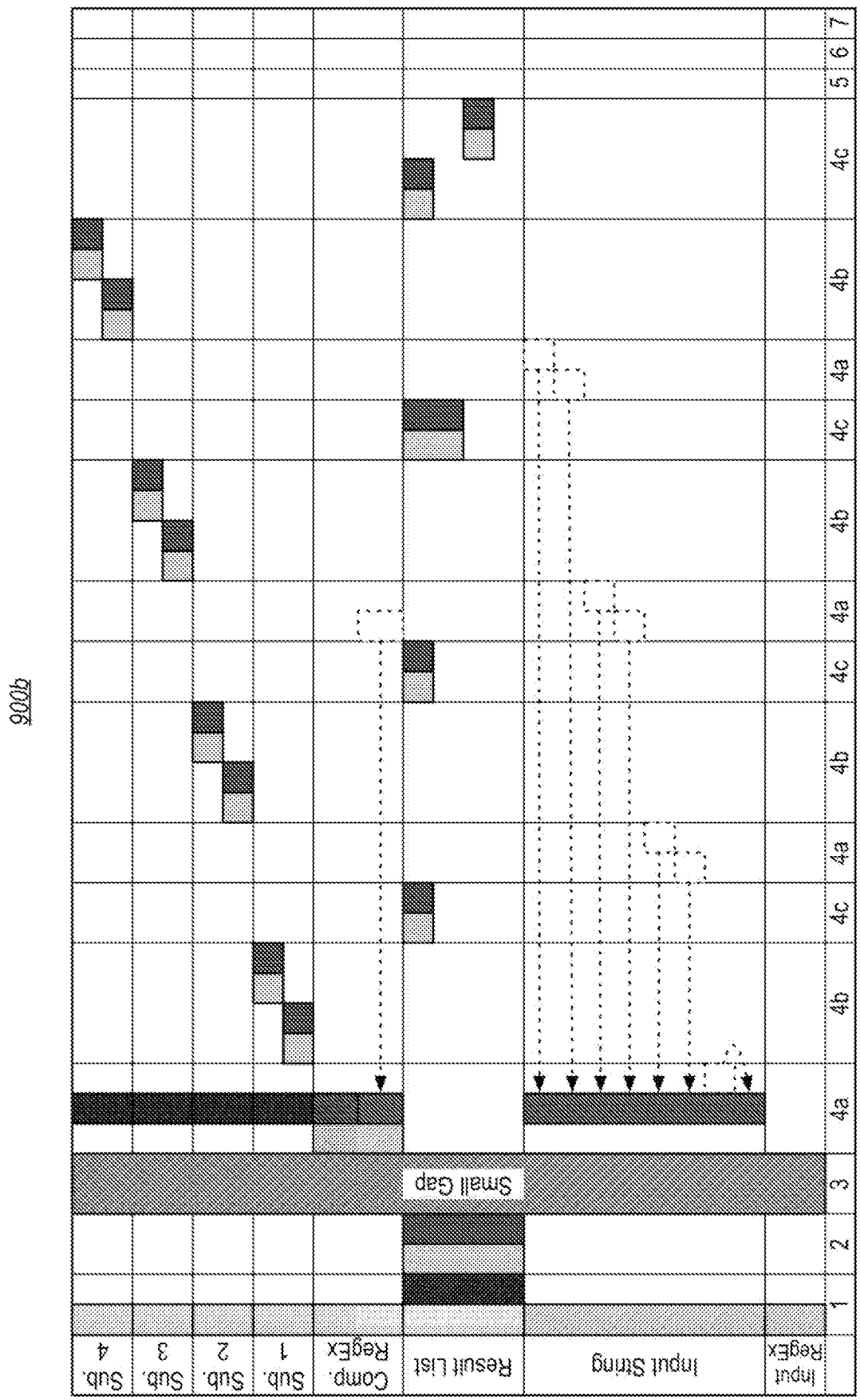
FIG. 9B illustrates an example timing diagram corresponding to execution of multiple fragments that split a string into pieces based on regular expression matches and which includes a gap, including performing inter-fragment memory movement.

Turning to FIG. 9B, timing diagram 900b demonstrates that, for time-travel debugging, the intra-fragment analysis component 117a can identify compatible memory cell values that can be exposed at the beginning of each fragment. For example, the broken arrows and broken boxes in FIG. 9B show that memory cell values in the second fragment (i.e., corresponding to reads from the input string and the compiled regular expression) can be prefetched from their natural time position in the trace and be made visible at the beginning of the second fragment (e.g., in the first instance of step 4a) during replay/emulation of the second fragment. FIG. 9B also shows that, during time-travel debugging, un-initialized memory cells can also be made visible at the beginning of the first and second fragments (e.g., in step 1 of the first fragment for the result list, and in the first instance of step 4A of the second fragment for the substrings), though FIG. 9B does not expressly show movement of this un-initialized memory via broken arrows or broken boxes.

Figure 9C:
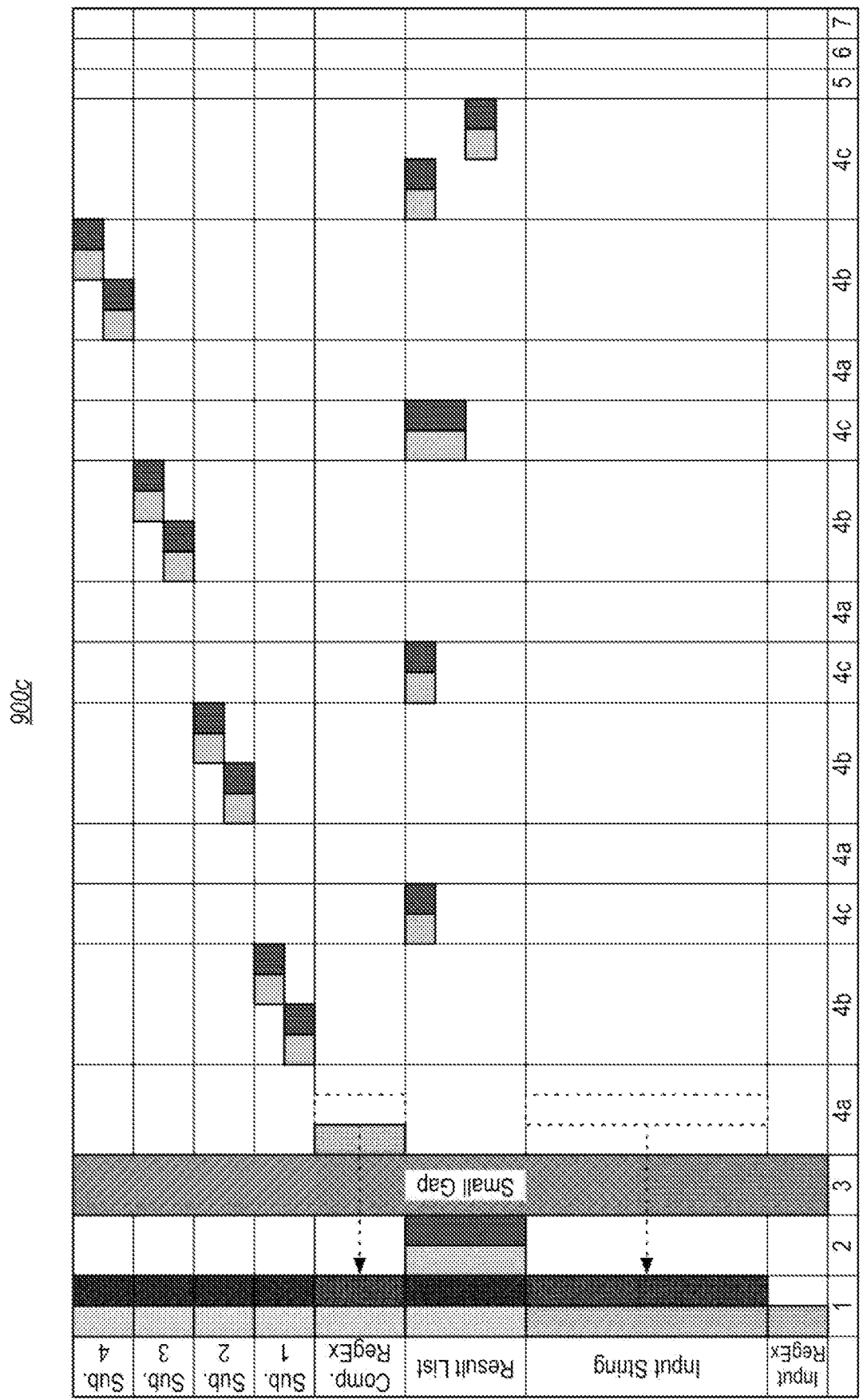
FIG. 9C illustrates an example timing diagram corresponding to execution of multiple fragments that split a string into pieces based on regular expression matches and which includes a gap, including performing memory movement across a gap based on an individual line movement analysis.

FIG. 9C illustrates a timing diagram 900c that demonstrates gap crossing after timing diagram 900b, based on an individual line movement analysis (i.e., the first heuristic above). Using this analysis, it is simply presumed that memory cell values are compatible with the gap at step 3. Thus, the broken arrows and broken boxes in FIG. 9C show that memory cell values in the second fragment (i.e., corresponding to reads from the input string and the compiled regular expression) can cross the gap to be made visible at the beginning of the first fragment (e.g., in step 1) during replay/emulation of the first fragment. Notably, this means that the complied regular expression would actually be visible prior to the function that generates the compiled regular expression having been called. However, there is little harm in doing this because there is no symbol to read that value until after the gap. Thus, while a user could see the value when looking at raw memory, there would be no symbols to describe that variable/memory. FIG. 9C also shows that, during time-travel debugging, un-initialized memory cells might also be made visible at the beginning of the first fragment (e.g., in step 1), though FIG. 9C does not expressly show movement of this un-initialized memory via broken arrows or broken boxes.

Figure 9D:
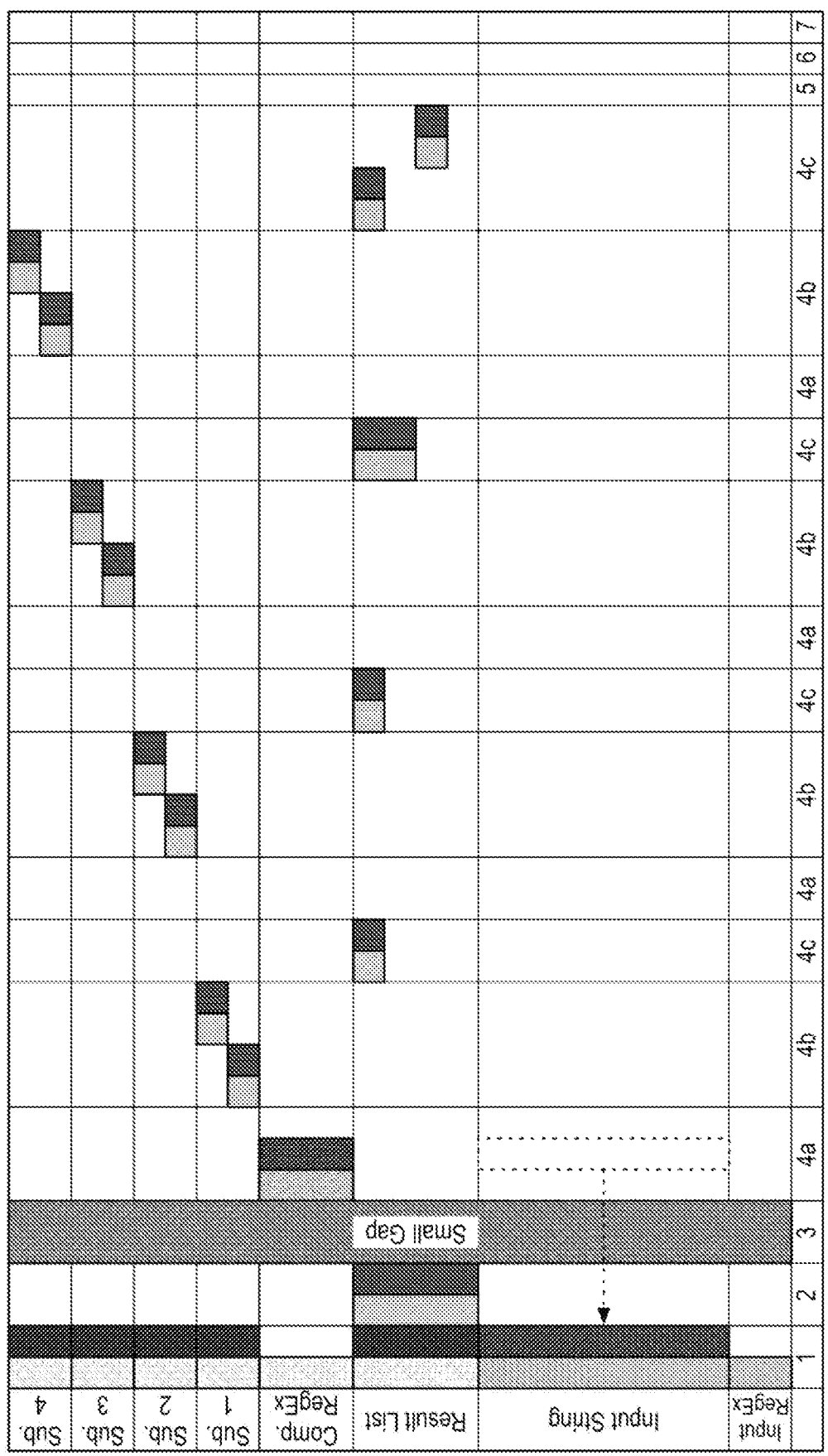
FIG. 9D illustrates an example timing diagram corresponding to execution of multiple fragments that split a string into pieces based on regular expression matches and which includes a gap, including performing memory movement across a gap based on an annotation-based analysis.

FIG. 9D illustrates a timing diagram 900d that demonstrates gap crossing after timing diagram 900b, based on an annotation-based analysis (i.e., the second heuristic above). Here, the gap analysis component 117c might leverage SAL annotation, contracts, etc. to determine that the gap will write to the buffer allocated for the compiled regular expression. As a result, the memory cell values in this buffer are incompatible with the gap. However, the memory cell values associated with the input string are compatible. Thus, the broken arrows and broken boxes in FIG. 9D show that memory cell values in the second fragment corresponding to the input string can cross the gap to be made visible at the beginning of the first fragment (e.g., in step 1) during replay/emulation of the first fragment. Note, however, that the memory cell values in the second fragment corresponding to the compiled regular expression cannot. FIG. 9D also shows that, during time-travel debugging, un-initialized memory cells corresponding to the substrings might also be compatible with the gap and be made visible at the beginning of the first fragment (e.g., in step 1), though FIG. 9C does not expressly show movement of this un-initialized memory via broken arrows or broken boxes.

Figure 9E:
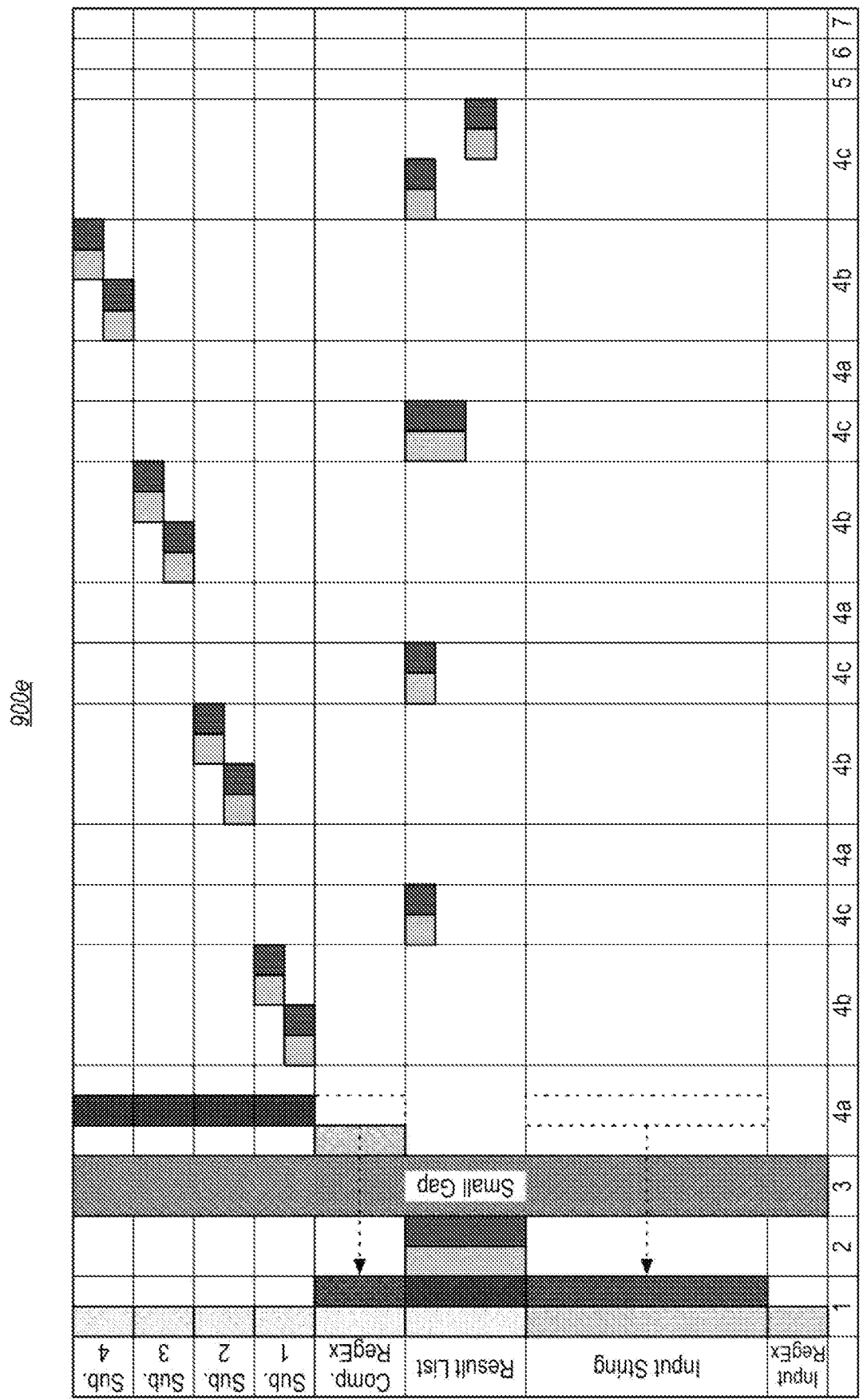
FIG. 9E illustrates an example timing diagram corresponding to execution of multiple fragments that split a string into pieces based on regular expression matches and which includes a gap, including performing memory movement across a gap based on an allocation-based analysis.

FIG. 9E illustrates a timing diagram 900e that demonstrates gap crossing after timing diagram 900b, based on an allocation-based analysis (i.e., the third heuristic above). Here, the gap analysis component 117c might observe that a buffer for the compiled regular expression and a buffer for the input string were allocated before the gap, and thus identify both of these buffers, in their entirety, as being compatible with the gap. Thus, the broken arrows and broken boxes in FIG. 9E show that memory cell values in the second fragment corresponding to the compiled regular expression and the input string can cross the gap to be made visible at the beginning of the first fragment (e.g., in step 1) during replay/emulation of the first fragment. FIG. 9E also shows that, during time-travel debugging, un-initialized memory cells corresponding to the substrings might not be compatible with the gap (i.e., because they were allocated after the gap), and thus they do not cross the gap.

Returning to FIG. 1B, the output component 118 generates a data output based on the analysis by the memory analysis component 117. This could include, for example, generating index data that supplements the accessed trace(s) 113 (e.g., as one or more of data streams 306) to indicate which memory values can be exposed earlier than a data packet representing a memory read, re-writing the one or more of the accessed trace(s) 113 to reposition memory cell values in the trace, and/or writing an entirely new trace 113 that includes the repositioned memory cell values. Accordingly, in FIG. 1B, the output component 118 is shown as potentially including an index data generation component 118a, a trace modification/re-writing component 118b, and/or a trace generation component 118c.

With particular focus on the trace modification/re-writing component 118b and the trace generation component 118c, it is noted that a re-written or newly generated trace, which includes repositioned memory values, can occupy less storage space than an originally-accessed trace 113. For example, suppose, within a given fragment, that there are multiple reads from a given memory cell. This could, in turn, mean that there are multiple data packets representing one or more values for that memory cell. If those values are compatible within the fragment, an initial value of the memory cell might be recorded at the beginning of the fragments, and the other data packets might be able to be dropped. The same applies across fragments. For example, if there are a series of fragments that are compatible with a memory cell value, that memory cell value might be pushed to the beginning for the series of fragments, and data packets corresponding to reads from that memory cell might be able to be dropped from the fragments. Accordingly, the trace modification/re-writing component 118b and/or the trace generation component 118c can lead to smaller traces which, in turn, might be able to be more efficiently emulated.

Figure 10:
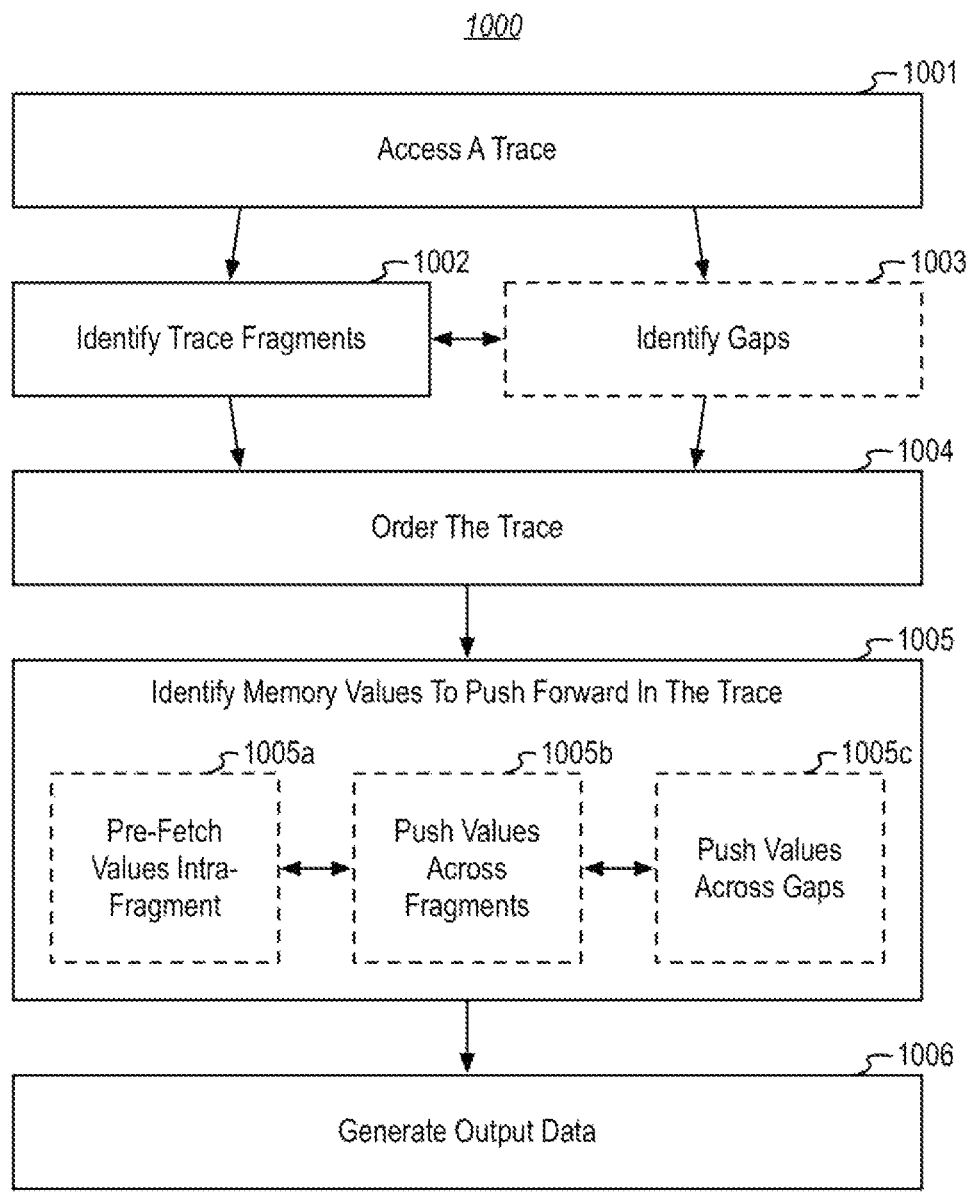
FIG. 10 illustrates a flowchart of an example method for generating data for exposing memory cell values during trace replay at execution times that are prior to execution times corresponding to events that caused the memory cell values to be recorded into a trace.

FIG. 10 illustrates a flowchart of an example method 1000 for generating data for exposing memory cell values during trace replay at execution times that are prior to execution times corresponding to events that caused the memory cell values to be recorded into a trace. Method 1000 is now described within the context of FIGS. 1A-9E, and their corresponding description.

As shown, method 1000 includes an act 1001 of accessing a trace. In some implementations, act 1001 comprises accessing a trace that represents prior execution of one or more threads. For example, referring to FIGS. 1A and 1B, the trace access component 114 can access one or more of trace(s) 113, which represent a prior execution of one or more of application(s) 112. FIG. 3 illustrates one example of a trace 300 that includes a plurality of trace data streams 301, each of which represents a thread of execution.

Method 1000 also includes an act 1002 of identifying trace fragments. In some implementations, act 1002 comprises identifying a plurality of trace fragments within a trace that represents prior execution of one or more threads, each trace fragment represents an uninterrupted consecutive execution of a plurality of executable instructions on a corresponding thread of the one or more threads, the plurality of trace fragments including at least a first trace fragment and a second trace fragment. For example, the fragment identification component 115a can identify fragments in the accessed trace(s) 113. For instance, FIGS. 3 and 4A illustrate that the trace 300 of FIG. 3 can be divided into fragments based on sequencing numbers.

Method 1000 may also include an act 1003 of identifying gaps. In some implementations, act 1003 comprises identifying a gap in trace recording caused by a call to non-traced code by the first trace fragment. Thus, the first trace fragment represents execution of first executable instructions of a first thread, and the second trace fragment represents execution of second executable instructions of the first thread, and wherein the first trace fragment and the second trace fragment are separated by the gap. For example, the gap identification component 115b can identify gaps in the accessed trace(s) 113. For instance, FIG. 5A shows two types of gaps—a big gap at arrow 504e where tracing for the second thread ceased for an unknown period of time, and a small gap at arrow 504g where recording of the first thread was suspended for a known purpose.

As shown, acts 1002 and 1003 might be performed in parallel. However, in implementations they could alternatively be performed serially (in either order).

Method 1000 also includes an act 1004 of ordering the trace. In some implementations, act 1004 comprises determining at least a partial ordering among the plurality of trace fragments, including determining that the first trace fragment can be ordered prior to the second trace fragment. For example, the trace ordering component 116 can identify a full or partial ordering of the fragments and gaps (if any) identified in acts 1002 and 1003. For instance, FIG. 4B shows that the trace fragments in FIG. 4A might be ordered based on sequencing events, and FIG. 5B shows that the trace fragments and gaps in FIG. 5A might be ordered based on sequencing events. Thus, in act 1004, the first trace fragment may be bounded by a first sequencing event and the second trace fragment may be bounded by a second sequencing event, and determining that the first trace fragment can be ordered prior to the second trace fragment may be based on determining that the first sequencing event occurred prior to the second sequencing event.

Method 1000 also includes an act 1005 of identifying memory values to push forward in the trace. For example, the memory analysis component 117 can use one or more types of analysis to identify memory values that can be exposed earlier than they appear in the trace.

As shown, act 1005 can include one or more sub-acts, including an act 1005a of pre-fetching values intra-fragment. In some implementations, act 1005a comprises determining that a memory cell value can be exposed, during replay of the second trace fragment, at a first execution time that is prior to a second execution time corresponding to an event that caused the memory cell value to be recorded in the trace during trace recording. This could include, for example, determining that the corresponding event is a read from the memory cell is a first (i.e., initial) represented read from that memory cell in the fragment. Alternatively, this could include determining that the memory cell value is compatible with one or more other memory accesses, within the second trace fragment, to the memory cell. For example, the intra-fragment analysis component 117a can perform a memory compatibility analysis within a fragment. This could include the intra-fragment analysis component 117a determining that the memory cell value is compatible with the one or more other memory accesses based on determining at least one of: (i) that the read from the memory cell is a first read within the second trace fragment from the memory cell; or (ii) that the read from the memory cell is a subsequent memory access, within the second trace fragment, to the memory cell, and that the memory cell value matches a prior known value of the memory cell within the second trace fragment. Examples of intra-fragment memory value compatibility/movement were discussed in connection with FIGS. 6A-7B. Thus, the second trace fragment might correspond to the fragment shown in FIGS. 6A and 6B, or the fragment shown in FIGS. 7A and 7B. Additional examples of intra-fragment memory value compatibility/movement were shown in FIGS. 8B and 9B.

The sub-acts of act 1005 might also include an act 1005b of pushing values across fragments. In some implementations, act 1005b operates when the first trace fragment represents execution of first executable instructions of a first thread and the second trace fragment represents execution of second executable instructions of a second thread, and when the first trace fragment is ordered prior to the second trace fragment, and can comprise determining that the memory cell value from the second trace fragment can be exposed prior to the first trace fragment during trace replay. This can include determining that the memory cell value is compatible with the first fragment. For example, the inter-fragment analysis component 117b can perform a memory compatibility analysis across fragments. This could include the inter-fragment analysis component 117b determining that the memory cell value is compatible with the first fragment based on determining at least one of: (i) that the first trace fragment has no memory accesses to the memory cell; or (ii) that the first trace fragment has one or more memory accesses to the memory cell, and that a first value of the memory cell at an end of the first trace fragment matches a second value of the memory cell at a beginning of the second trace fragment. Examples of inter-fragment memory value compatibility/movement were discussed in connection with FIGS. 8A-8D. Thus, the first trace fragment discussed in connection with this act might correspond to the fragment covering the steps prior to step F in FIGS. 8A-8D, and the second trace fragment discussed in connection with this act might correspond to the fragment covering the steps after step F in FIGS. 8A-8D.

As mentioned, memory snapshots might be considered to be fragments that do read operations, and act 1005b might therefore push values across memory snapshots. For example, if the first trace fragment and the second trace fragment are separated by a memory snapshot, act 1005b might comprise determining that the memory cell value from the second trace fragment can be exposed prior to the memory snapshot during trace replay. To determine if that the memory cell value from the second trace fragment can be exposed prior to the memory snapshot during trace replay, the fragment analysis component 117b could determine one of: (i) that the memory snapshot lacks snapshot information for the memory cell, or (ii) that the memory snapshot stores a first value for the memory cell that matches a second value for the memory cell at a beginning of the second trace fragment.

The sub-acts of act 1005 might also include an act 1005c of pushing values across gaps. If a small gap exists between the first and second fragments discussed in connection with method 1000, in some implementations, act 1005c comprises determining that the memory cell value from the second trace fragment can be exposed prior to the gap during trace replay. This can include determining that the memory cell value is compatible with the gap. For example, the gap analysis component 117c can use one or more heuristics to determine compatibility of a memory cell with a gap. These heuristics could include, for example, an individual line movement analysis (i.e., assume the memory cell is compatible), an annotation-based analysis (i.e., determine whether or not a parameter annotation to the function call indicates that the called function could write to the memory cell), an allocation-based analysis (i.e., whether or not the memory cell is part of a memory buffer that includes another memory cell that is, or can be, exposed prior to the gap), and/or an allocation-as-annotation-based analysis (i.e., determine whether or not the function takes the memory cell, or a pointer the memory cell, as a parameter).

While not expressly shown in FIG. 10, one or more of acts 1005a-1005c are parallelizable (e.g., for improved performance/responsiveness). For example, some implementations may do the analysis in act 1005a for each individual fragment independently of the other fragments, and hence potentially in parallel. Other implementations may do the analysis for each memory cell (or buffer) independently. Yet other implementations may perform an intra-fragment analysis independently for each fragment, but then move to a per-buffer analysis for the inter-fragment and the gap crossing phases. As those of ordinary skill in the art will appreciate, these tasks can be organized in multiple ways to enable their parallelization. However, in implementations, acts 1005a-1005c could alternatively be performed serially (in various orders). For example, some implementations might perform acts 1005a-1005c serially in the order of 1005a, then 1005b, then 1005c.

Method 1000 also includes an act 1006 of generating output data. In some implementations, act 1006 comprises generating output data indicating that the memory cell value can be exposed prior to the first execution time during replay of the second trace fragment. For example, the output component 118 can use the index data generation component 118a to generate trace index data that supplements the accessed trace(s) and that indicates that the memory cell value can be exposed at an execution time point that is earlier than a data packet representing a memory read as determined by the memory analysis component 117, can use the trace modification/re-writing component 118b to modify an existing trace to move/re-order trace data as determined by the memory analysis component 117, and/or can use the trace generation component 118c generate an entirely new trace that represents memory values as determined by the memory analysis component 117. Thus, in act 1006, generating the output data could comprise at least one of supplementing the trace with index data based on the generated output data, re-writing the trace based on the generated output data, or generating a new trace based on the generated output data. This might additionally, or alternatively, comprise modifying a prior memory snapshot of the trace to contain the memory cell value based on the generated output data, inserting a memory snapshot comprising the memory cell value based on the generated output data, and the like.

Regardless of the form of the output data, this data could include generating trace output data that indicates that the memory cell value can be exposed, during replay of the second trace fragment, at a beginning of the second trace fragment (i.e., an intra-fragment movement); generating output data that indicates that the memory cell value can be exposed, during trace replay, prior to the first trace fragment (i.e., an inter-fragment movement); generating trace output that indicates that the memory cell value can be exposed, during trace replay, prior to the gap (i.e., crossing a gap); and/or generating trace output that indicates that the memory cell value can be exposed, during trace replay, prior to the memory snapshot (i.e., crossing a memory snapshot).

Figure 11:
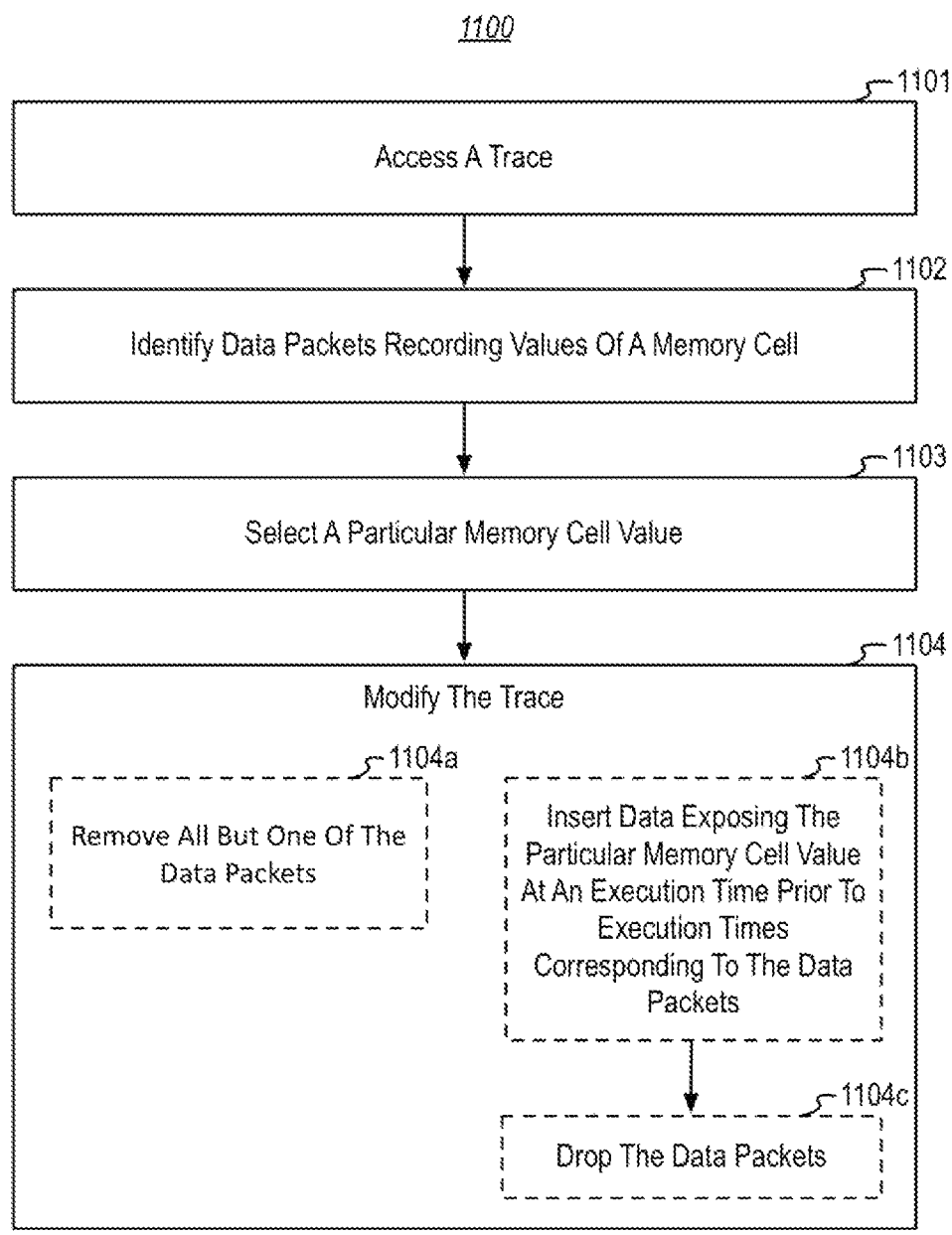
FIG. 11 illustrates a flowchart of an example method for modifying a trace to expose memory cell values prior to execution times corresponding to events that caused the memory cell values to be recorded into the trace.

As mentioned, generating output data could include re-writing a trace. To illustrate this concept, FIG. 11 illustrates a flowchart of an example method 1100 for modifying a trace to expose memory cell values prior to execution times corresponding to events that caused the memory cell values to be recorded into the trace. Method 1100 is now described within the context of FIGS. 1A-9E, and their corresponding description.

As shown, method 1100 includes an act 1101 of accessing a trace. In some implementations, act 1101 comprises accessing a trace that represents prior execution of one or more threads. For example, referring to FIGS. 1A and 1B, the trace access component 114 can access one or more of trace(s) 113, which represent a prior execution of one or more of application(s) 112. FIG. 3 illustrates one example of a trace 300 that includes a plurality of trace data streams 301, each of which represents a thread of execution.

Method 1100 also includes an act 1102 of identifying data packets recording values of a memory cell. In some implementations, act 1102 comprises identifying, within the trace, a plurality of data packets that each represents a corresponding memory cell value read from a particular memory cell, each of the plurality of data packets corresponding to at least one execution event. Method 1100 also includes an act 1103 of selecting a particular memory cell value. In some implementations, act 1103 comprises selecting a particular memory cell value recorded in one of the plurality of data packets. For example, the memory indexing component 109 can identify multiple compatible accesses to a memory cell in the trace, and determine that at least one of the memory cell values can be pushed earlier in the trace.

As discussed, the memory indexing component 109 can take several approaches to determining memory compatibility. For example, the memory indexing component 109 can initially identify fragments in the trace (i.e., using the trace parsing component 115). As such, method 1100 might include parsing the trace to identify a plurality of trace fragments, including a first trace fragment and a second trace fragment, wherein each trace fragment represents an uninterrupted consecutive execution of a plurality of executable instructions on a corresponding thread of the one or more threads. In this situation, the plurality of data packets might correspond to the second trace fragment. In addition, the memory indexing component 109 might identify at least a partial ordering among those fragments (i.e., using the trace ordering component 116). For instance, method 1100 might also include determining at least a partial ordering among the plurality of trace fragments, including determining that the first trace fragment is orderable prior to the second trace fragment.

Having identified fragments and an ordering among at least two fragments, the memory indexing component 109 can use the memory analysis component 117 to identify the multiple compatible accesses to a memory cell in the trace, and to determine that at least one of the memory cell values can be pushed earlier in the trace. This can include, for example, an intra-fragment analysis (i.e., intra-fragment analysis component 117a), an inter-fragment analysis (i.e., inter-fragment analysis component 117b), and/or a gap analysis (i.e., gap analysis component 117c).

Method 1100 also includes an act 1104 of modifying the trace. The particular actions taken to modify/re-write the trace could vary. For example, FIG. 11 shows that act 1104 could include an act 1104a of removing all but one of the data packets from a trace fragment. In some implementations, act 1104a comprises removing all but one of the plurality of data packets from at least one trace fragment. For example, the trace modification/re-writing component 118b might drop all but the first data packet in a trace fragment. Taken to an intra-fragment level, the trace modification/re-writing component 118b might even drop all but the first data packet in the trace. Alternatively, act 1104 could include an act 1104b of inserting data exposing the particular memory cell value at an execution time prior to execution times corresponding to the data packets, and an act 1105 of dropping the data packets. In some implementations, acts 1104b and 1104c comprise inserting data into the trace that exposes the selected particular memory cell value at an execution time during trace replay that is prior to execution times of the execution events corresponding to the plurality of data packets, and removing the plurality of data packets from the trace. For example, the trace modification/re-writing component 118b can insert data into the trace that exposes the particular memory cell value earlier than execution times of execution events corresponding to the plurality of data packets, such as at (or near) the beginning of the second fragment, in the first fragment, or even in an earlier fragment. This may also include crossing gaps and/or memory snapshots. The trace modification/re-writing component 118b might also drop data packets corresponding to the subsequent memory accesses, since they can be obtained via the inserted memory cell value and/or via a replay of the trace based on the inserted memory cell value.

As one example, method 1100 could operate to move a memory value intra-fragment. In this embodiment, the intra-fragment analysis component 117a could determine that the selected particular memory cell value is compatible within the second fragment. Then, when inserting the data into the trace that exposes selected particular memory cell value at the execution time during trace replay that is prior to the execution times of the execution events corresponding to the plurality of data packets, act 1104 could comprise inserting data into the trace that exposes the selected particular memory cell value at a beginning of the second trace fragment.

As another example, method 1100 could operate to move a memory value inter-fragment. In this example, the inter-fragment analysis component 117b could determine that the selected particular memory cell value is compatible with the first trace fragment. Then, when inserting the data into the trace that exposes the selected particular memory cell value at the execution time during trace replay that is prior to the execution times of the execution events corresponding to the plurality of data packets, act 1104 could comprise inserting data into the trace that exposes the selected particular memory cell value in the first trace fragment. In embodiments, when determining that the selected particular memory cell value is compatible with the first trace fragment, the inter-fragment analysis component 117b could determine at least one of (i) that the first trace fragment has no memory accesses to the particular memory cell, or (ii) that the first trace fragment has one or more memory accesses to the particular memory cell, and that a value of the particular memory cell at an end of first trace fragment matches a second value of the particular memory cell at a beginning of the second trace fragment.

As yet another example, method 1100 could operate to move a memory value across a memory snapshot. In this example, the first trace fragment and second trace fragment could be separated by a memory snapshot, and the inter-fragment analysis component 117b could determine that the selected particular memory cell value is compatible with the memory snapshot. Then, when inserting the data into the trace that exposes the selected particular memory cell value at the execution time during trace replay that is prior to the execution times of the execution events corresponding to the plurality of data packets, act 1104 could comprise inserting data into the trace that exposes the selected particular memory cell value in the first trace fragment and prior to the memory snapshot. In embodiments, when determining that the selected particular memory cell value is compatible with the memory snapshot, the inter-fragment analysis component 117b could determine at least one of (i) that the memory snapshot lacks snapshot information for the particular memory cell, or (ii) that the memory snapshot stores a first value for the particular memory cell that matches a second value for the particular memory cell at a beginning of the second trace fragment.

As yet another example, method 1100 could operate to move a memory value across a gap. In this example, the first trace fragment and second trace fragment could be separated by a small gap in trace recording, and the gap analysis component 117c could determine that the selected particular memory cell value is compatible with this small gap. Then, when inserting the data into the trace that exposes the selected particular memory cell value at the execution time during trace replay that is prior to the execution times of the execution events corresponding to the plurality of data packets, act 1104 could comprise inserting data into the trace that exposes the selected particular memory cell value in the first trace fragment and prior to the small gap. In embodiments, when determining that the selected particular memory cell value is compatible with the first trace fragment, the gap analysis component 117*c* could determine at least one of (i) whether or not a parameter annotation to a function call indicates that a called function could write to the particular memory cell, (ii) whether or not the particular memory cell is part of a memory buffer that includes another memory cell that is, or can be, exposed prior to the gap, (iii) or whether or not the function takes the particular memory cell, or a pointer the particular memory cell, as a parameter.

As mentioned in connection with the trace ordering component 116, embodiments might identify a total order among fragments, or a partial order among fragments. For instance, if all memory cell values at the beginnings and ends of two (or more) trace fragments are compatible, regardless of the ordering of the fragment(s), the trace ordering component 116 might not enforce a total order among them, and instead enable these trace fragments to be partially ordered. In embodiments, partially ordering fragments might provide some opportunities for improved compatibility analysis. For example, suppose there are four fragments, A, B, C, and D that—due to shared compatibility of fragments A, B, and C—are ordered such that fragment A comes first and fragment D comes last, but fragments B and C could appear in either order. In this situation, a memory cell value could be pushed from fragment C to Fragment A directly, without consideration of fragment B. In addition, when considering compatibility of a particular memory cell value in fragment D (which is not entirely compatible with the other fragments) with fragments A, B, and C, this compatibility could be made in parallel (e.g., using a mapreduce split on fragments A, B, and C).

As mentioned previously, the memory analysis component 117 can include an inter-thread analysis component 117*d* that performs inter-thread analysis to enable efficient thread-focused analysis. In particular, the memory analysis component 117 inserts memory snapshot data into one or more thread(s) trace(s) that enables these thread(s) to be replayed independent of other threads, while still being able to present a correct view of memory locations that were interacted with by those other threads. As will be appreciated by one of ordinary skill in the art, when debugging multi-threaded applications software developers often analyze program execution one thread at a time rather than analyzing all of the program's threads together. Thus, for example, when analyzing a time-travel trace, a developer might conduct queries that analyze memory addresses touched and/or memory values observed by a selected traced thread. As discussed in connection with FIG. 3, a trace 300 might include a different trace data stream 301 for each thread. While these data streams 301 may be recorded independently, memory is a global resource, and thus one thread might make changes to a memory cell that is visible to another thread (even if it may not be used by the other thread). Thus, when replaying a single thread, and/or when processing queries that are focused on a single thread, a debugger may need to consider what memory was interacted with by one or more other threads in order to provide a correct view of memory. This frequently includes replaying (i.e., emulation component 111) portions of those other thread(s)—which consumes additional processing and memory resources, and increases the amount of time needed to replay the thread and/or to process and respond to a query. To address this inefficiency, the inter-thread analysis component 117*d* can perform an inter-thread analysis of traced threads that can be used by the output component 118 to generate and insert memory snapshot data into a trace that enables one or more threads to be replayed and/or queried independent of other traced threads, while still being able to present a correct view of memory locations that were interacted with by those other traced threads.

Figure 12A:
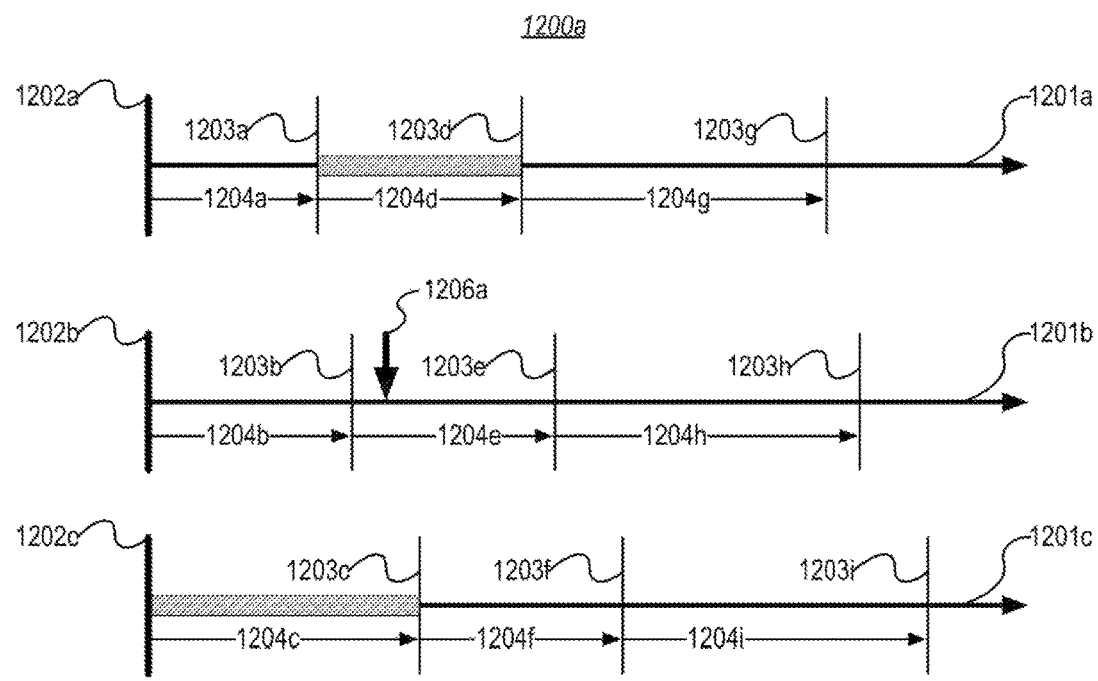
FIG. 12A illustrates an example timing diagram that includes timeliness of execution of three threads, including fragment execution up to a particular point in one of the timelines.

These concepts are now described in connection with FIGS. 12A-12H. FIG. 12A illustrates an example timing diagram 1200*a* that is similar to the timing diagram 400*a* of FIG. 4A, and in which like elements are similarly labeled. For instance, FIG. 12A shows three timelines 1201 (i.e., timelines 1201-1201*c*, similar to timelines 401) of execution of three threads, in which key frames 1202 (i.e., key frames 1202*a*-1202*c*, similar to key frames 402) and/or sequencing events 1203 (i.e., sequencing events 1203*a*-1203*i*, similar to sequencing event 403) are usable to divide these timelines 1201 into fragments. Similarly, FIG. 12B illustrates an example timing diagram 1200*b* showing one potential total ordering of the fragments in FIG. 12A, based on the sequencing events 1203, much like in example 400*b* of FIG. 4B.

Figure 12B:
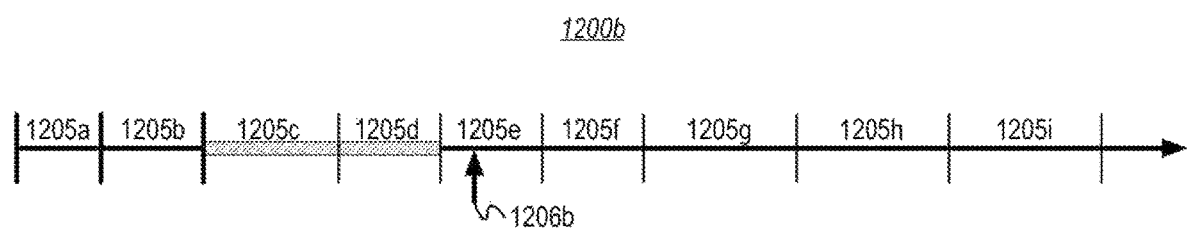
FIG. 12B illustrates an example timing diagram showing one potential total ordering of the fragments in FIG. 4A to reach the particular point.

FIGS. 12A and 12B demonstrate how a replay or query of the thread corresponding to timeline 1201*b* might be conducted. In particular, FIGS. 12A and 12B include arrows 1206 (i.e., arrow 1206*a* in FIG. 12A, and arrow 1206*b* in FIG. 12B) pointing to a particular point in timeline 1201*b*, which is in the fragment 1205*e* corresponding to arrow 1204*e* between sequencing events 1203*b* and 1203*e*. These arrows 1206 indicate a point in the thread's execution that needs to be reached as part of a replay of the thread, and/or in order to process a query focused on thread. With reference to timeline 1201*b*, there is one trace fragment 1205*b* (i.e., corresponding to arrow 1204*b*) preceding trace fragment 1205*e* on the timeline. However, as shown in FIG. 12B, when following the illustrated total ordering of trace fragments, there are two intervening fragments (i.e., between fragments 1205*b* and 1205*e*) from other threads: fragment 1205*c* (i.e., corresponding to arrow 1204*c*) on timeline 1201*c* and fragment 1205*d* (i.e., corresponding to arrow 1204*d*) on timeline 1201*a*. Both of these intervening fragments are shown in cross-hatch shading along timelines 1201*a* and 1201*c*. Being between fragments 1205*b* and 1205*e*, intervening fragment 1205*c* and/or intervening fragment 1205*d* might have altered the value(s) of one or more memory cells that are visible to fragment 1205*b* and/or fragment 1205*e*.

Using conventional techniques, an analysis of timeline 1201*b* from its beginning (i.e., key frame 1202*b*) up to the execution point at arrows 1206 might include a replay of portions of timelines 1201*a* and 1201*c*, in addition to portions of timeline 1201*b*. For instance, the emulation component 111 might start at key frame 1202*a* and replay each of fragments 1205*a*-1205*d* (i.e., as ordered in FIG. 12B), and then replay a portion of fragment 1205*e* to reach the execution point at arrows 1206. Thus, even though the focus of analysis may be on timeline 1201*b*, the emulation component 111 has replayed fragments 1205*a* and 1205*d* from timeline 1201*a* and fragment 1205*c* from timeline 1201*c*. Some of this replay might be mitigated if additional key frames are present. For instance, if there was a key frame at sequencing event 1203*a*, an analysis of timeline 1201*b* from key frame 1202*b* might exclude replay of fragment 1205a; however, it would still include a replay of intervening fragments 1205c and 1205d. It is noted that, while key frames might exist at fragment boundaries (as in the Figures), this need not always be the case—they could exist mid-fragment, and they might not exist at fragment boundaries at all.

Figure 12C:
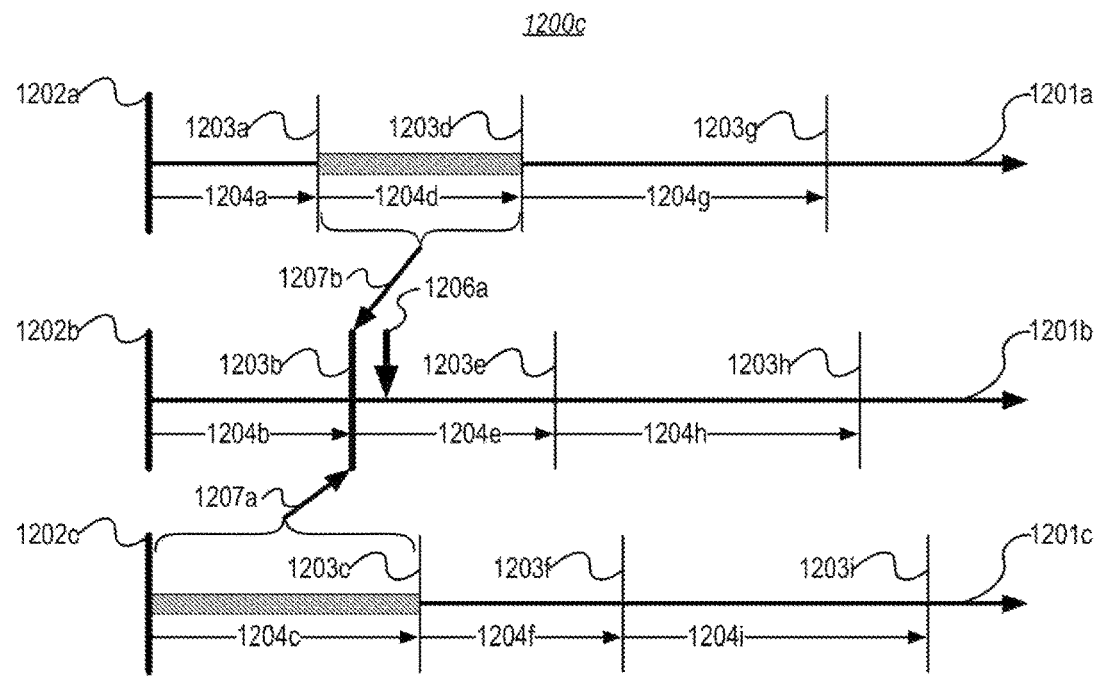
FIG. 12C illustrates an example timing diagram that corresponds generally to the timing diagram of FIG. 12A, but which demonstrates insertion of memory snapshot data based on an intervening fragment.
Figure 12D:
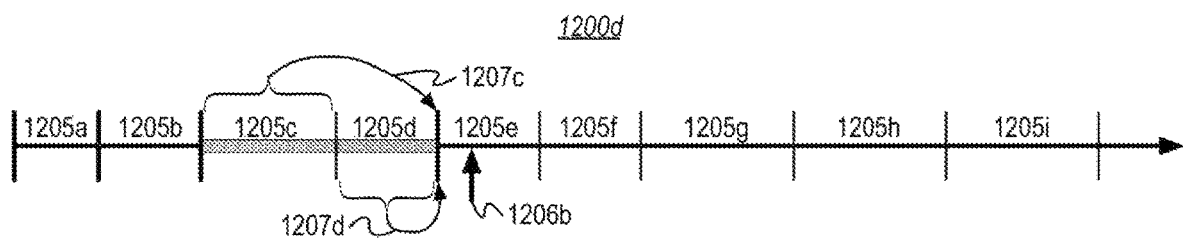
FIG. 12D illustrates an example timing diagram that corresponds generally to the timing diagram of FIG. 12B, but which demonstrates insertion of memory snapshot data based on an intervening fragment.

To mitigate the need to replay intervening fragments from threads that are not a focus of analysis, the inter-thread analysis component 117d can analyze these intervening fragments to determine which memory cells they interacted with. Based on this analysis, the output component 118 can produce memory snapshots that can identify these interacted—with memory cells. For instance, FIGS. 12C and 12D illustrate example timing diagrams 1200c and 1200d that correspond to timing diagrams 1200a and 1200b, but which include arrows 1207 pointing from fragments 1205c/1205d to sequencing event 1203b. For example, arrows 1207a and 1207c point from fragment 1205c to sequencing event 1203b, and arrows 1207b and 1207d point from fragment 1205d to sequencing event 1203b. These arrows 1207 represent insertion of memory snapshot data at sequencing event 1203b. In embodiments, the memory snapshot may be part of a key frame that enables replay to commence at sequencing event 1203b, though this need not necessarily be the case.

As used herein, the terms "memory snapshot," "memory snapshot data," and the like should be broadly construed to include any data that at least identifies one or more memory cells, or that could be used to identify one or more memory cells. In embodiments, this memory snapshot data identifies one or more memory cells that were interacted with by fragments 1205c and/or 1205d. For example, the memory snapshot data could include address(es) of these memory cell(s), address range(s) covering these memory cell(s), value(s) of these memory cells (e.g., the value(s) of those cell(s) at the end of fragment 1205d), etc. Notably, memory snapshot data might identify memory cells, but not include values. This memory snapshot data might even identify cell(s) related to those cells that were interacted with by fragments 1205c/1205d, but which were not actually interacted with by fragments 1205c/1205d. For example, if an interacted with memory cell is part of a memory buffer, the memory snapshot data might identify the entire memory buffer (e.g., by address range of memory cells in the buffer, by pointer to the buffer, etc.), and may even include actual memory cell values within the buffer. In another example, if an interacted with memory cell stores a pointer, the memory snapshot data might identify one or more memory cell(s) that are accessible using the pointer, and may even include memory cell values within those pointed-to memory cells. Notably, related memory cells might be identified using techniques described above in connection with the gap analysis component 117c (e.g., allocated buffers, SAL annotations, contracts, and the like). In embodiments, if a memory snapshot includes only memory address information, a debugger conducting a query on a given thread (e.g., timeline 1201b) might replay an intervening fragment (e.g., fragment 1250d) to obtain value only if the query actually accesses a memory address referenced in the snapshot.

Figure 12E:
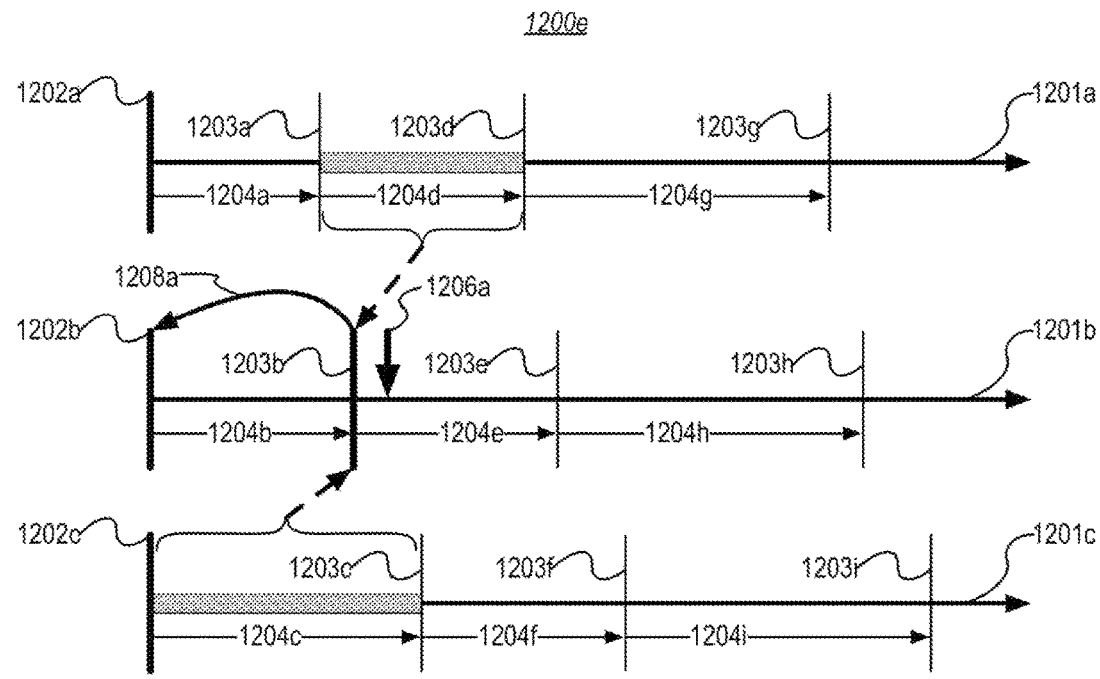
FIG. 12E illustrates an example timing diagram that corresponds generally to the timing diagram of FIG. 12C, but which demonstrates pushing compatible memory snapshot data towards the beginning of a trace.
Figure 12F:
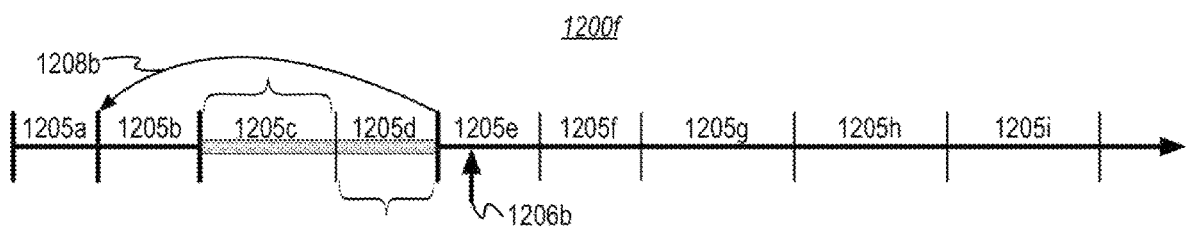
FIG. 12F illustrates an example timing diagram that corresponds generally to the timing diagram of FIG. 12D, but which demonstrates pushing compatible memory snapshot data towards the beginning of a trace.

While the inter-thread analysis component 117d might identify memory snapshot data for insertion at (or near) sequencing event 1203b (i.e., between fragments 1205b and 1205e, identifying memory cells and/or values interacted with by intervening fragments 1205c and/or 1205d), the inter-thread analysis component 117d might additionally, or alternatively, identify memory snapshot data for insertion prior to fragment 1205b. For instance, FIGS. 12E and 12F illustrate example timing diagrams 1200e and 1200f that correspond to timing diagrams 1200c and 1200d, but which now include arrows 1208 (i.e., arrow 1208a in FIG. 12E and arrow 1208b in FIG. 12F) pointing from sequencing event 1203b to key frame 1202b. These arrows 1208 represent insertion of memory snapshot data at key frame 1202b in addition to, or as an alternative to, memory snapshot data inserted at sequencing event 1203b. For example, the inter-thread analysis component 117d might initially identify memory snapshot data that could be inserted at sequencing event 1203b, and then perform an inter-fragment compatibility analysis to determine that it could be pushed forward to the beginning of timeline 1201b. Thus, in embodiments, the inter-thread analysis component 117d might push memory snapshot as far towards the beginning of a trace data stream as memory value compatibility will allow.

Figure 12G:
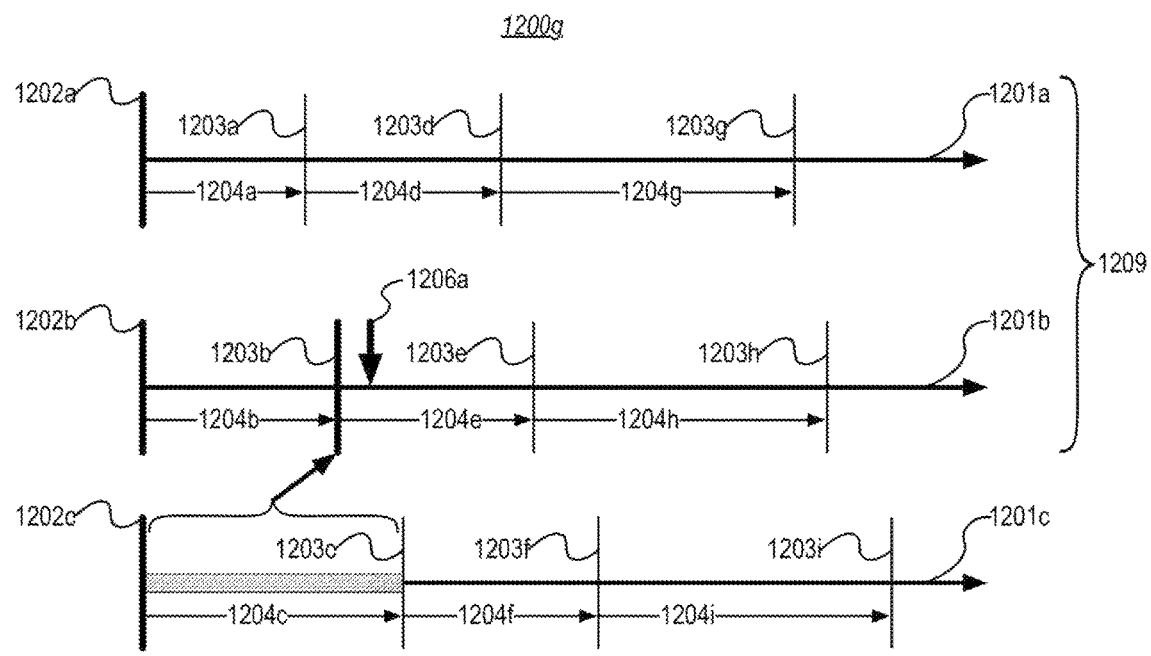
FIG. 12G illustrates an example timing diagram that corresponds generally to the timing diagram of FIG. 12A, but which illustrates memory snapshotting in the presence of focus groups.
Figure 12H:
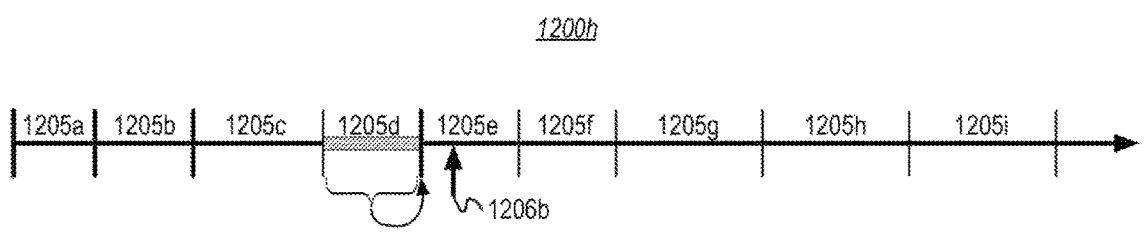
FIG. 12H illustrates an example timing diagram that corresponds generally to the timing diagram of FIG. 12B, but which illustrates memory snapshotting in the presence of focus groups.

While the foregoing description of the inter-thread analysis component 117d has been primarily concerned with enabling a single thread to be replayed/queried independently, it will be appreciated that the inter-thread analysis component 117d can also enable groups of threads to be replayed/queried independent of threads outside of the group. For example, when analyzing a time-travel trace, a developer might conduct queries that analyze a selected "focus group" of related threads (e.g., threads that operate on the same data structure) together. For instance, a service host process in MICROSOFT WINDOWS might contain several services inside of it, and the threads for each of those services might be part of a different focus group. To illustrate focus groups, FIGS. 12G and 12H illustrate example timing diagrams 1200g and 1200h that correspond to timing diagrams 1200a and 1200b, but which show that timelines 1201a and 1201b correspond to threads that are party of a focus group 1209. Thus, the inter-thread analysis component 117d might perform an analysis that enables replay/analysis of timelines 1201a and 1201b independent of timeline 1201c. Because timelines 1201a and 1201b are now part of a focus group, trace fragment 1205c is no longer intervening to replay of those threads. Thus, in FIGS. 12G and 12H, only fragment 1205d is shown in cross-hatch shading as being an intervening fragment to replay of timelines 1201a and 1201b up to the point at arrows 1206. As also shown, only this fragment is now used for generation of memory snapshot data for insertion at (or near) sequencing event 1203b (and/or or pushing to an earlier point in timeline 1201a and/or 1201b if compatible).

Figure 13:
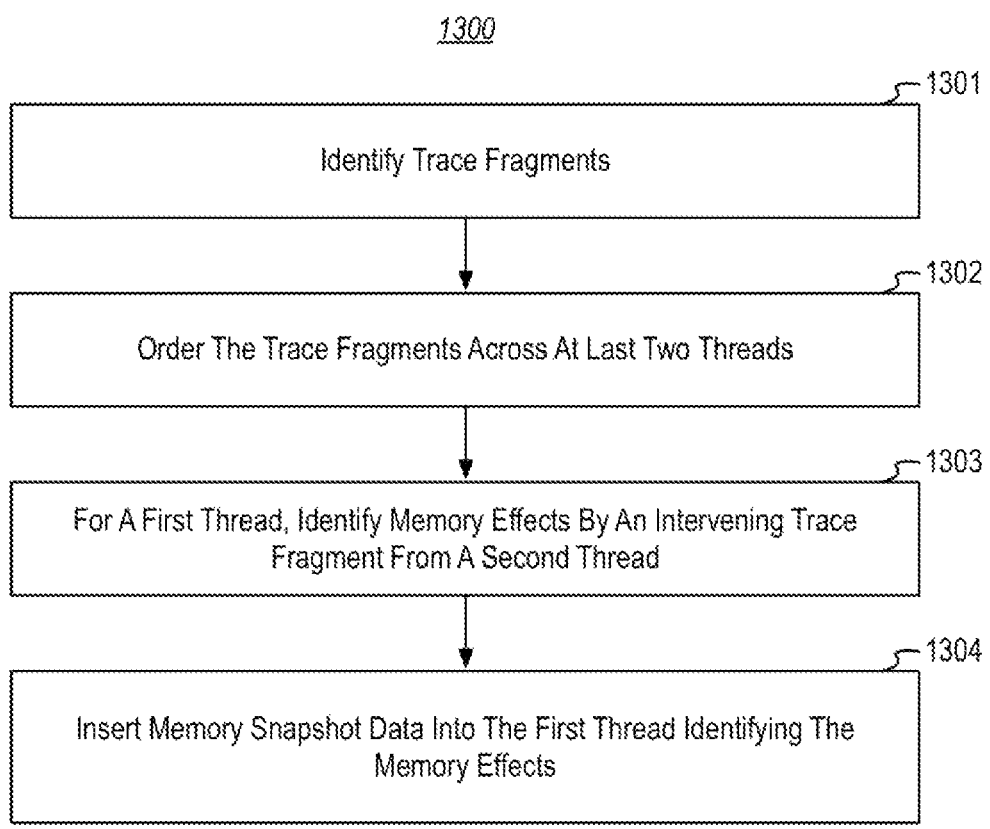
FIG. 13 illustrates a flowchart of an example method for creating memory snapshot data that reduces processing for thread-focused analysis.

In view of the foregoing description of the inter-thread analysis component 117d, FIG. 13 illustrates a flowchart of an example method 1300 for creating memory snapshot data that reduces processing for thread-focused analysis (e.g., replay/querying). Method 1300 is now described within the context of FIGS. 1A-12H, and their corresponding description.

As shown, method 1300 includes an act 1301 of identifying trace fragments. In some implementations, act 1301 comprises identifying a plurality of trace fragments within a trace that represents prior execution of a plurality of threads, each trace fragment representing an uninterrupted consecutive execution of a plurality of executable instructions on a corresponding thread of the plurality of threads, the plurality of trace fragments including a first and a second trace fragment corresponding to a first thread, and a third trace fragment corresponding to a second thread. For example, based on the trace access component 114 accessing a trace 113, the fragment identification component 115a might identify at least a subset of the trace fragments shown in FIGS. 12A-12-H. These identified trace fragments might include, for example, trace fragments 1205*b* and 1205*e* from thread/timeline 1201*b* (e.g., the first and second trace fragments corresponding to the first thread) and trace fragment 1205*c* (e.g., the third trace fragment corresponding to the second thread).

Method 1300 also includes an act 1302 of ordering the trace fragments across at least two threads. In some implementations, act 1302 comprises determining at least a partial ordering among the plurality of trace fragments, including determining that the first trace fragment is orderable prior to the second trace fragment on the first thread, and that the third trace fragment is orderable between the first and second trace fragments. For example, the trace ordering component 116 can identify a possible ordering among the trace fragments identified in act 1301. Among this ordering, the trace ordering component 116 might determine that fragment 1205*b* is orderable prior to fragment 1205*c*, and that fragment 1205*c* is orderable prior to fragment 1205*e*. Based on this ordering, this means that fragment 1205*b* is orderable prior to fragment 1205*e* on timeline 1201*b*.

Method 1300 also includes an act 1303 of, for a first thread, identifying memory effects by an intervening trace fragment from a second thread. In some implementations, act 1303 comprises, based on the third trace fragment being orderable between the first and second trace fragments, identifying at least one memory cell that is interacted with by one or more executable instructions whose execution is recorded by the third trace fragment. For example, the intra-thread analysis component 117*d* might determine that intervening fragment 1205*c*, which is orderable between fragments 1205*b* and 1205*e*, interacts with one or more memory cells.

Method 1300 also includes an act 1304 of inserting memory snapshot data into the first thread identifying the memory effects. In some implementations, act 1304 comprises inserting memory snapshot data into trace data corresponding to the first thread, the memory snapshot data at least identifying the at least one memory cell. For example, based on the analysis in act 1303 by the intra-thread analysis component 117*d*, the output component 118 might insert memory snapshot data into a trace data stream corresponding to thread/timeline 1201 that identifies the at least one memory cell. Inserting memory snapshot data could include modifying a trace data stream, itself (e.g., trace data stream 301*b*), or supplementing a trace with additional indexing data (e.g., a data structure in one of data streams 306). Thus, in act 1304, inserting the memory snapshot data identifying the at least one memory cell into trace data corresponding to the first thread could comprise at least one of (i) inserting the memory snapshot data into a trace data stream representing execution of first thread, or (ii) inserting the memory snapshot data as index data that supplements the trace data stream for the first thread.

As discussed, the particular data that is inserted by the output component 118 can vary. For instance, it might identify the memory cell by address and/or address range. Thus, in act 1304, the memory snapshot data identifying the at least one memory cell might comprise at least one of (i) an address of the at least one memory cell, or (ii) an address range that includes the at least one memory cell. In addition to address information, the data that is inserted by the output component 118 could include value information. Thus, in act 1304, the memory snapshot data identifying the at least one memory cell might comprise a value of the at least one memory cell after execution of the third trace fragment (i.e., fragment 1205*c*). In embodiments, the output component 118 could identify related memory cells in addition, as an alternative, to interacted with memory cell(s). Thus, in act 1304, the at least one memory cell might be a first memory cell, and the memory snapshot data could also identify at least a second memory cell that is related to the first memory cell. In embodiments, this second memory cell could be related to the first memory cell based on at least one of: (i) the first and second memory cells being part of a memory buffer, or (ii) the second memory cell being reachable based on a value of the first memory cell (e.g., when the first memory cell stores a pointer).

In act 1304, the memory snapshot data could be inserted into various locations in the first thread. For instance, as described in connection with FIGS. 12C and 12D, it could be inserted at sequencing event 1203*b*. In this case, in act 1304 inserting the memory snapshot data identifying the at least one memory cell into trace data corresponding to the first thread could comprise inserting the memory snapshot on the first thread at an end of the first trace fragment, at a beginning of the second trace fragment, or between the first and second trace fragments. Additionally, or alternatively, as described in connection with FIGS. 12E and 12F, the memory snapshot data could be inserted at some earlier point in the trace, such as at the beginning of the trace. In this case, in act 1304 inserting the memory snapshot data identifying the at least one memory cell into trace data corresponding to the first thread could comprise inserting the memory snapshot on the first thread at a beginning of, or prior to, the first trace fragment. In embodiments, memory snapshot data might be pushed as far forward in the trace a memory compatibility allows. Thus, even though some memory snapshot data might be pushed to the beginning of a trace, some incompatible data might need to be inserted at sequencing event 1203*b*. Thus, in act 1304 the memory snapshot might be inserted at the beginning of the second trace fragment based on a second value of the at least one memory cell after execution of the third trace fragment being incompatible with a first value of the of the at least one memory cell in a prior memory snapshot on the first thread. In embodiments, the memory snapshot data that is inserted in act 1304 might be a full memory snapshot, a partial memory snapshot, or a differential memory snapshot (i.e., relative to one or more prior memory snapshots). Inserting memory snapshot data could include modifying a trace data stream, itself (e.g., trace data stream 301*b*), or supplementing a trace with additional indexing data (e.g., a data structure in one of data streams 306).

In view of the disclosure described in connection with FIGS. 12G and 12H, it will be appreciated that method 1300 might operate to generate and insert memory snapshot data that enables groups of threads to be replayed/queried independent of other threads. Thus, act 1301 might also include identifying a fourth fragment (e.g., fragment 1205*d*) corresponding to a third thread (e.g., thread/timeline 1201*a*). Additionally, act 1302 might include determining that the fourth trace fragment is also orderable between the first and second trace fragments. Then, based on the first and third threads being part of a thread focus group (e.g., group 1209), act 1303 could include, based on the first and third threads being part of the thread focus group, determining that any memory cells whose values are interacted with by one or more executable instructions whose execution is represented by the fourth trace fragment need not be inserted as memory snapshot data into the trace data corresponding to the first thread. For example, even though trace fragment 1205*d* intervenes trace fragments 1205*b* and 1205*e*, there is no need to insert memory snapshot data relating to memory changed by trace fragment 1205*d* into a trace for thread/ timeline 1201b, since threads/timelines 1201a and 1201b will be replayed/queried together.

It will be appreciated that the embodiments disclosed herein can provide a variety of valuable technical benefits. From a debugging standpoint, presenting memory values at execution times earlier than they were recorded in a trace provides more valuable debugging information, including memory information that is more closely aligned with memory information available during live debugging. From a trace standpoint, the ability to expose memory values to earlier during trace replay enables trace size to be reduced by dropping data packets storing the same memory value or a derivative of that memory value than can be obtained via trace replay—resulting in smaller and more efficiently replayed traces.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes at least one processor, comprising:
   identifying a plurality of trace fragments within a trace that records prior execution of one or more threads, each trace fragment recording an uninterrupted consecutive execution of a plurality of executable instructions on a corresponding thread of the one or more threads, the plurality of trace fragments including at least a first trace fragment and a second trace fragment;
   determining at least a partial ordering among the plurality of trace fragments, including determining that the first trace fragment can be ordered prior to the second trace fragment;
   based on performing an inter-fragment analysis of the first trace fragment and the second trace fragment, determining that a value of a memory cell recorded into the second trace fragment is compatible with the first trace fragment;
   determining that the value of the memory cell can be exposed, during a replay of the trace, at a first execution time that is prior to a second execution time corresponding to an event that caused the value of the memory cell to be recorded into the second trace fragment; and
   generating output data indicating that the value of the memory cell can be exposed at the first execution time during the replay of the trace.

2. The method of claim 1, wherein the first execution time corresponds to an event recorded by the first trace fragment.

3. The method of claim 1, wherein:
   the first trace fragment includes a first sequencing event, and the second trace fragment includes a second sequencing event; and
   determining that the first trace fragment can be ordered prior to the second trace fragment is based on determining that the first sequencing event occurred prior to the second sequencing event.

4. The method of claim 1, wherein determining that the value of the memory cell recorded into the second trace fragment is compatible with the first trace fragment comprises determining at least one of,
   that the first trace fragment has no memory accesses to the memory cell, or
   that the first trace fragment has a memory access to the memory cell, and that a first value of the memory cell associated with the first trace fragment matches a second value of the memory cell prior to the second sequencing event.

5. The method of claim 1, wherein:
   the first trace fragment and the second trace fragment are separated by a memory snapshot; and
   first execution time is prior to the memory snapshot.

6. The method of claim 1, wherein:
   the second trace fragment includes a sequencing event; and
   determining that the value of the memory cell can be exposed, during the replay of the trace, at the first execution time comprises determining that the value of the memory cell can be exposed, during the replay of the trace, prior to a memory access that occurs before the sequencing event.

7. The method of claim 1, wherein:
   the first trace fragment and the second trace fragment are separated by a gap corresponding to execution of non-traced code; and
   determining that the value of the memory cell can be exposed, during the replay of the trace, at the first execution time comprises using a source code annotation associated with a function in the non-traced code to determine that the value of the memory cell is compatible with the gap.

8. The method of claim 7, wherein the source code annotation indicates a memory buffer received as an input to the function in the non-traced code, and wherein the value of the memory cell is determined to be compatible with the gap based on the memory cell not overlapping with the memory buffer.

9. The method of claim 7, wherein the source code annotation indicates that the function in the non-traced code is an invariant method, and wherein the value of the memory cell is determined to be compatible with the gap based on the memory cell overlapping with a memory buffer used by the function.

10. The method of claim 7, wherein the source code annotation is a postcondition annotation that requires that a memory buffer have a same value at entry to and exit from the function in the non-traced code, and wherein the value of the memory cell is determined to be compatible with the gap based on the memory cell overlapping with the memory buffer.

11. The method of claim 7, wherein the source code annotation indicates that the function in the non-traced code has no externally visible side effects, and wherein the value of the memory cell is determined to be compatible with the gap based on the memory cell not being used by the function.

12. The method of claim 1, further comprising, based on performing an intra-fragment analysis of the second trace fragment, determining that a value of a memory cell recorded into the second trace fragment is compatible with one or more memory accesses to the memory cell that occurred during a recording of the second trace fragment prior to an event that caused the value of the memory cell to be recorded into the second trace fragment.

13. The method of claim 12, wherein the first execution time corresponds to an event recorded by the second trace fragment.

14. The method of claim 12, wherein determining that the value of the memory cell recorded into the second trace fragment is compatible with the one or more memory accesses to the memory cell that occurred during the recording of the second trace fragment prior to the event that caused the value of the memory cell to be recorded into the second trace fragment comprises determining that a first value of the memory cell recorded into the second trace fragment at the event matches a second value of the memory cell prior to the one or more memory accesses to the memory cell.

15. A computer system comprising:
a processor; and
a computer storage media that stores computer-executable instructions that are executable by the processor to cause the computer system to at least:
identify a plurality of trace fragments within a trace that records prior execution of one or more threads, each trace fragment recording an uninterrupted consecutive execution of a plurality of executable instructions on a corresponding thread of the one or more threads, the plurality of trace fragments including at least a first trace fragment and a second trace fragment;
determine at least a partial ordering among the plurality of trace fragments, including determining that the first trace fragment can be ordered prior to the second trace fragment;
based on performing an inter-fragment analysis of the first trace fragment and the second trace fragment, determine that a value of a memory cell recorded into the second trace fragment is compatible with the first trace fragment;
determine that the value of the memory cell can be exposed, during a replay of the trace, at a first execution time that is prior to a second execution time corresponding to an event that caused the value of the memory cell to be recorded into the second trace fragment; and
generate output data indicating that the value of the memory cell can be exposed at the first execution time during the replay of the trace, wherein the first execution time corresponds to an event recorded by the first trace fragment.

16. The computer system of claim 15, wherein:
the first trace fragment includes a first sequencing event, and the second trace fragment includes a second sequencing event; and
determining that the first trace fragment can be ordered prior to the second trace fragment is based on determining that the first sequencing event occurred prior to the second sequencing event.

17. The computer system of claim 15, wherein determining that the value of the memory cell recorded into the second trace fragment is compatible with the first trace fragment comprises determining at least one of,
that the first trace fragment has no memory accesses to the memory cell, or
that the first trace fragment has a memory access to the memory cell, and that a first value of the memory cell associated with the first trace fragment matches a second value of the memory cell prior to the second sequencing event.

18. The computer system of claim 15, wherein:
the first trace fragment and the second trace fragment are separated by a memory snapshot; and
first execution time is prior to the memory snapshot.

19. The computer system of claim 15, wherein:
the first trace fragment and the second trace fragment are separated by a gap corresponding to execution of non-traced code; and
determining that the value of the memory cell can be exposed, during the replay of the trace, at the first execution time comprises using a source code annotation associated with a function in the non-traced code to determine that the value of the memory cell is compatible with the gap.

20. A computer program product comprising a hardware storage device that stores computer-executable instructions that are executable by a processor to cause a computer system to at least:
identify a plurality of trace fragments within a trace that records prior execution of one or more threads, each trace fragment recording an uninterrupted consecutive execution of a plurality of executable instructions on a corresponding thread of the one or more threads, the plurality of trace fragments including at least a first trace fragment and a second trace fragment;
determine at least a partial ordering among the plurality of trace fragments, including determining that the first trace fragment can be ordered prior to the second trace fragment;
based on performing an inter-fragment analysis of the first trace fragment and the second trace fragment, determine that a value of a memory cell recorded into the second trace fragment is compatible with the first trace fragment;
determine that the value of the memory cell can be exposed, during a replay of the trace, at a first execution time that is prior to a second execution time corresponding to an event that caused the value of the memory cell to be recorded into the second trace fragment; and
generate output data indicating that the value of the memory cell can be exposed at the first execution time during the replay of the trace, wherein the first execution time corresponds to an event recorded by the first trace fragment.

* * * * *